United States Patent [19]

Boiteau et al.

[11] Patent Number: 5,335,177
[45] Date of Patent: Aug. 2, 1994

[54] METHOD AND SYSTEM FOR ENSURING THE RELIABILITY OF DATA USED TO PILOT AN AIRCRAFT

[75] Inventors: Catherine Boiteau; Roger Parus, both of Merignac, France

[73] Assignee: Sextant Avionique, Meudon la Foret Cedex, France

[21] Appl. No.: 807,478

[22] Filed: Dec. 16, 1991

[30] Foreign Application Priority Data

Dec. 14, 1990 [FR] France .................. 90 15687
Dec. 14, 1990 [FR] France .................. 90 15688

[51] Int. Cl.⁵ .................. G06F 11/00; G06F 11/16
[52] U.S. Cl. .................. 364/424.06; 318/563; 318/564; 244/195; 364/424.01
[58] Field of Search ........... 364/424.01, 149, 424.06; 318/563-565; 235/153; 244/195

[56] References Cited

U.S. PATENT DOCUMENTS

| 3,688,099 | 8/1972 | Buscher . |
| 4,032,757 | 6/1977 | Eccles .................. 235/150.2 |
| 4,101,958 | 7/1978 | Patterson et al. .................. 364/200 |
| 4,327,437 | 4/1982 | Gelderloos .................. 371/68 |
| 4,698,785 | 10/1987 | Desmond et al. .................. 364/900 |
| 5,079,707 | 1/1992 | Bird et al. .................. 364/424.04 |
| 5,222,065 | 6/1993 | Krogmann .................. 371/19 |

FOREIGN PATENT DOCUMENTS

| 144226 | 6/1985 | European Pat. Off. . |
| 2431912 | 1/1976 | Fed. Rep. of Germany . |
| 7817512 | 1/1979 | France . |
| 2030334 | 4/1980 | United Kingdom . |
| 2170336 | 7/1986 | United Kingdom . |

OTHER PUBLICATIONS

Daniel M. Wilbers et al, "Detection Filters for Aircraft Sensor and Actuator Faults", ICCON '89 IEEE International Conference on Control and Applications, Apr. 1989, pp. 1-6, (p. 3 paragraph 4 & p. 4 paragraph 4.3).

Primary Examiner—Thomas G. Black
Assistant Examiner—Julie D. Day
Attorney, Agent, or Firm—Cushman, Darby & Cushman

[57] ABSTRACT

The disclosure relates to systems for piloting aircraft. Equations of the movements of the aircraft are used for computing, in a computer, of the first and second derivatives parameters $V_p$, $\Phi_v$, $\sigma_a$, $\beta_v$, $\alpha$, $\Phi_v$, $\sigma_a$, $\beta_v$, of the parameters $V_p$, $\Phi_v$, $\sigma_a$, $\beta_v$, $\alpha$ of the movement of the aircraft, and the values thus computed are compared with those computed by means of the values of said parameters $V_p$, $\Phi_v$, $\sigma_a$, $\beta_v$, $\alpha$ at the instants t, (t+dt) and (t+2dt). An alarm signal (circuit 23) is generated if equality is not verified to a given precision.

24 Claims, 7 Drawing Sheets

METHOD AND SYSTEM FOR ENSURING THE RELIABILITY OF DATA USED TO PILOT AN AIRCRAFT

BACKGROUND OF THE INVENTION

1. Field of the Invention

The invention relates to aircraft piloting systems and more particularly, in such systems, to a method and a sub-system to check the piloting data presented to the pilot or pilots.

To pilot an aircraft, a pilot needs to have knowledge of a certain number of information elements or data on the status of the aircraft. These data elements come from various pieces of equipment on board and, notably, from a device for the computation of the piloting data. These data are presented by means of standard instruments such as graduated dials, counters, indicators etc., but also, ever increasingly, through images obtained by means of display devices such as cathode-ray tubes, plasma panels, light-emitting diodes, electroluminescent or liquid crystal display panels etc. These image display devices enable the display of several parameters on one and the same surface, either simultaneously or successively, or at the pilot's request. This reduces the number of conventional instruments on the instrument panel.

In certain applications, the data are projected optically before the pilot's eyes, the projection screen being such as to enable the pilot to see the "outside scene" too in his line of sight, whence the term "head-up display" which can be integrated into the pilot's helmet in the case of military aircraft. In this case it is more commonly called a "helmet display".

The transmission lines conveying information between the sensors and the display screens are lengthy and complex, and usually include the above-mentioned devices for the computing of piloting data. As a result, the possibility of erroneous display cannot be ruled out. There is therefore provision for the pilot to make cross-checks between the indications of the display screens and those of the onboard instruments in order to detect inconsistencies. These checks are done in flight at the pilot's discretion. Such checks entail a very major burden of additional work for the pilot.

2. Description of the Prior Art

A known way of detecting an erroneous piece of information without the pilot's intervention lies in setting up a redundancy of the pieces of equipment in the transmission line and in comparing the values given by the redundant pieces of equipment at several points of the line corresponding to different levels of complexity in the preparation of the final information that is displayed. The detection of an inconsistency then prompts at least one alarm which is brought to the knowledge of the pilot.

The redundancy of the equipment leads to an increase in the complexity of the piloting and navigation system as well as the weight of the entire structure. The result thereof is a substantial increase in the cost. Furthermore, it does not enable a comprehensive checking of transmission lines conveying information to the pilot in that it does not allow the information given by non-redundant sensors to be questioned.

Besides, the checks made, both by the pilot and through the redundancy of equipment are "static" inasmuch as they compare two values at a given instant and are not concerned with the changes undergone by the aircraft in the course of time.

An object of the present invention therefore is to set up a system for ensuring the reliability of data used to pilot an aircraft, wherein the checks of consistency between data displayed on the screens and those provided by the sensors and the piloting information computing device are done automatically.

Another object of the present invention is to set up a system for ensuring the reliability of the data used to pilot an aircraft wherein the checks of consistency between the information elements displayed on the screens and those of the onboard instruments are done automatically and continuously, without any active intervention by the pilot.

Another object of the present invention is to set up a system for ensuring the reliability of the data used to pilot an aircraft wherein the changing situation of the aircraft is taken into account.

Yet another object of the present invention is to set up a reliability and safety system such as this without any redundancy of equipment.

SUMMARY OF THE INVENTION

The invention relates to a method for ensuring the reliability of the data used to pilot an aircraft, said data corresponding, firstly, to parameters given by the sensors and, secondly, to parameters known as navigation parameters that are given by a computing device and presented to the pilot, either by means of onboard instruments or by means of a symbol generator associated with a display device giving a display in the form of synthesis images that include one or more reticles as well as alphanumerical characters, wherein said method comprises the following steps of:

(a) detecting and recognizing synthesis images so as to obtain digital signals representing piloting information elements presented to the pilot;

(b) computing one or more navigation parameters and/or sensor parameters from said digital signals;

(c) comparing said computed parameters with the values of the same parameters given by said computation device or by the sensors so as to detect the inconsistencies between the compared parameters;

(d) generating an alarm signal when one or more inconsistencies go beyond a determined threshold.

The step (c) could also include a comparison of said computed parameters with the values of the same parameters given by the instruments.

The digital signals representing the piloting data may be given either directly by the symbol generator or after processing by the display device or display screen of said display device.

The invention also relates to a system to implement the above-described method, said system comprising:

means to give digital signals that represent piloting data that are given to the pilot;

a first computer to compute one or more navigation parameters from said digital signals;

a first comparator to compare the values of the navigation parameters given by the first computer with those of the same parameters given by the computation device or by the instruments, and to generate an alarm signal when the result of the comparison indicates that the compared values are different beyond a certain threshold;

a second computer to compute one or more sensor parameters from the values of the navigation parameters given either by the computation device or by the first parameter, and a second comparator to compare the values of the sensor parameters given by the second computer with those given by the corresponding sensors or the onboard instruments and to generate an alarm signal when the result of the comparison indicates that the compared values are different beyond a certain threshold.

Of course, the first and second computers as well as the first and second comparators may constitute only one computer.

The invention also relates to a method for ensuring the reliability of the data used to pilot an aircraft, said data corresponding, firstly, to parameters given by sensors and, secondly, to parameters called navigation parameters that are given by a computing device and onboard instruments, wherein said method comprises the following steps of:

(a) computing, from the navigation parameters $\sigma_a$, $\beta_v$, the instants t and (t+dt), the first derivatives $\sigma_a$, $\beta_v$, at the instant t, (b) checking the relationship (2) defined hereinafter by using the values of the parameters $V_p$, $\Phi_v$, $\sigma_a$ and $\beta_v$ at the instant t and of the first derivatives $\sigma_a$ et $\beta_v$ at the instant t computed by the operation (a), and (c) generating an alarm signal when said relationship (2) is not verified to a given precision.

The above-described method may be complemented by the following steps of:

(d) computing from the navigation parameters $\sigma_a$, $\beta_v$, $\Phi_v$ and $\alpha$ at the instants t, (t+dt) and (t+2dt), the first derivatives $\sigma_a$, $\beta_v$, $\Phi_v$ and $\alpha$ and the second derivatives $\sigma_a$ $\beta_v$ and $\Phi_v$ at the instant t, (e) checking the relationships (4) and (6) defined hereinafter by using the values of $V_p$, $\sigma_a$, $\beta_v$, $\Phi_v$, $\alpha$ and of the first derivatives $\sigma_a$, $\beta_v$, $\Phi_v$, $\alpha$ and second derivatives $\sigma_a$ and $\beta_v$ and $\Phi_v$ at the instant (t) computed by the operation (d), and (f) generating an alarm signal when one of said relationships (4) and (6) is not checked to a given precision.

It may also include the following steps of:

(g) computing, by means of the relationships (1), (3) and (5) the forces F, R and Z applied to the aircraft at the instant t by using the values of the parameters $V_p$, $\Phi_v$, $\sigma_a$, $\beta_v$, $\alpha$ at the instant t, the values of the first derivatives $V_p$, $\Phi_v$, $\sigma_a$, $\beta_v$, $\alpha$ at the instant t computed from $V_p$, $\Phi_v$, $\sigma_a$, $\beta_v$ and $\alpha$ at the instants t and (t+dt) and the values of the secondary derivatives $\sigma_a$ and $\beta_v$ at the instant t computed from $\sigma_a$ and $\beta_v$ at the instants t (t+dt) and (t+2dt) by using the relationships (15) to (22) defined hereinafter;

(h) computing, from the navigation parameters $V_p$, $\Phi_v$, $\sigma_a$, $\beta_v$, and $\alpha$ at the instant (t+dt) and from the values of the applied forces obtained by the operation (g), of the parameters $V_p$, $\Phi_v$, $\sigma_a$, $\beta_v$, $\alpha$, $\Phi_v$, $\sigma_a$, $\beta_v$ at the instant (t+dt) in using the relationships (7) to (14) defined hereinafter, computing the parameters $V_p$, $\Phi_v$, $\sigma_a$, $\beta_v$, $\Phi_v$, $\alpha$ $\sigma_a$ and $\beta_v$ at the instant (t+dt) in using the values of the parameters $V_p$, $\Phi_v$, $\sigma_a$, $\beta_v$, and $\alpha$ at the instants (t+dt), (t+2dt) and (t+3dt)

(j) comparing the values of the parameters computed by the operation (h) with those computed by the operation (i);

(k) generating an alarm signal when the result of the comparison indicates that one of the values compared is different beyond a certain threshold.

One variant makes use, in the operation (g), of the values of the parameters $V_p$, $\Phi_v$, $\sigma_a$, $\beta_v$, and $\alpha$ at the instant t and the values of the first derivatives $V_p$, $\Phi_v$, $\sigma_a$, $\beta_v$, $\alpha$ and of the second derivatives $\sigma_a$, $\beta_v$ which have been computed by the operation (h) for the instant t.

BRIEF DESCRIPTION OF THE DRAWINGS

Other objects, features and advantages of the present invention shall appear from the following description of a particular exemplary embodiment, made with reference to the appended drawings, of which.

DETAILED DESCRIPTION OF THE INVENTION

Figure 1:
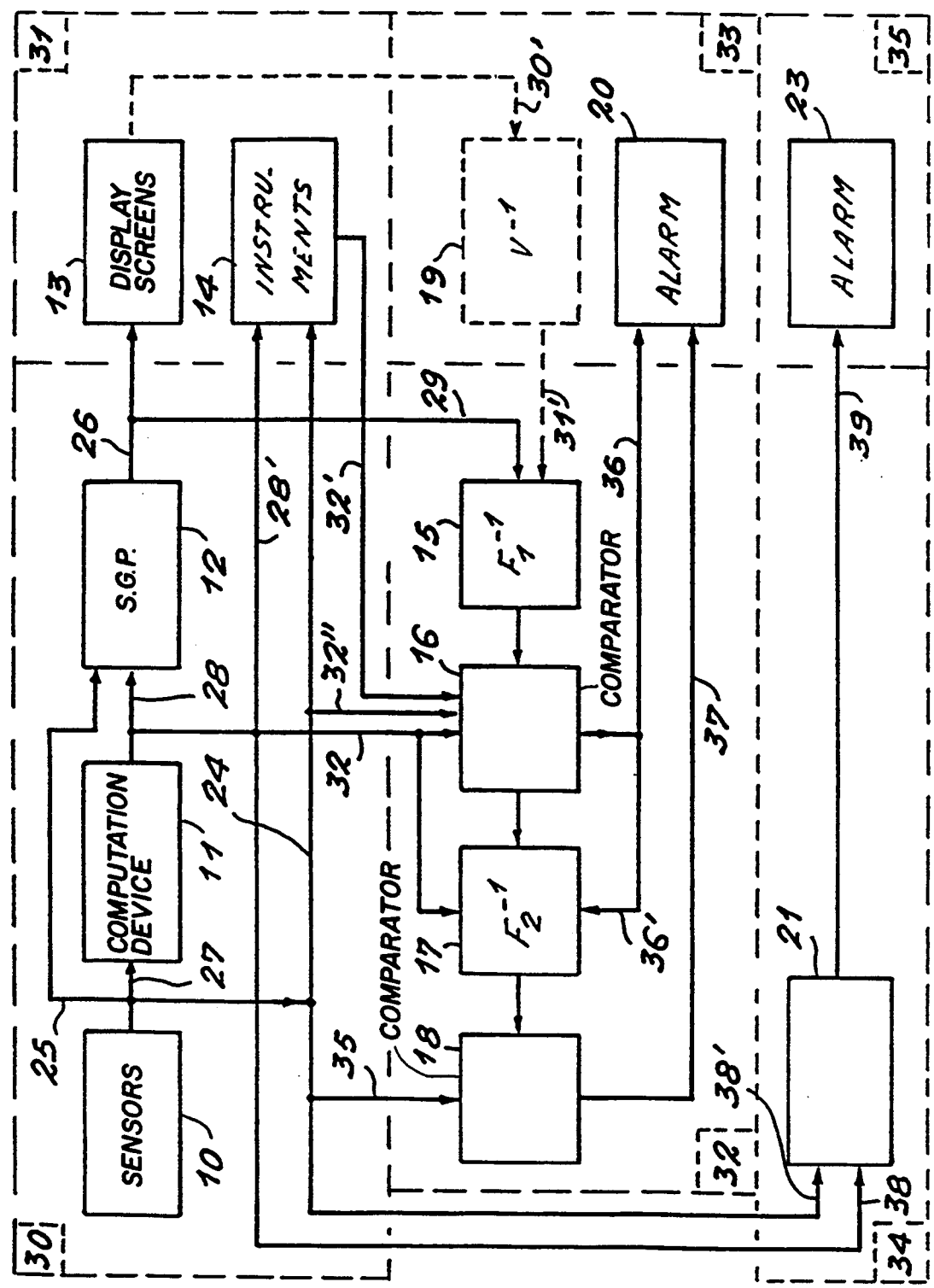
FIG. 1 is a diagram showing the different functions performed in a transmission line to convey piloting data for an aircraft, comprising the system for ensuring the reliability of said data according to the invention.

The data used to pilot an aircraft, which are also called navigation parameters, are presented to the pilot on an instrument panel 31 (FIG. 1) by means of onboard instrument dials 14 and one or more display screens 13. As indicated in the preamble, the image of a display screen may be projected before the pilot's eyes by an appropriate optical system. The data presented come from sensors 10 and from a computation device 11, either directly or by means of a Symbol Generator Pack (S.G.P.) 12, this entire assembly being referenced 30. Table 1 lists the sensors as well as the corresponding parameters which are rough physical measurements made on board the aircraft.

Moreover, table 2 lists the panel instruments as well as the corresponding parameters.

The sensor parameters are used by certain onboard instruments 14 (link 24) or by the symbol generator pack (link 25) to be displayed on the display screen 13 (link 26).

TABLE 1

| SENSORS | SENSOR PARAMETERS |
| --- | --- |
| Pitot tubes | $P_S$ static pressure<br>$P_T$ total pressure |

TABLE 1-continued

| SENSORS | SENSOR PARAMETERS |
| --- | --- |
| Temperature probe | $T_T$ total temperature |
| Incidence probe | $\alpha$ incidence |
| Inertial Navigation Unit | bearing $\beta$ |
| | elevation $\Theta$ |
| | roll $\Phi$ |
| | acceleration along $\sigma_N$ |
| | three axes $\sigma_v$ |
| | (absolute reference $\sigma_E$ |
| | system) |
| Flux valve | $C_M$ magnetic course |
| Radio-altimeter | HRS height over ground |
| Instrument Landing | $\epsilon_l$ loc deviation |
| System (ILS) | $\epsilon_g$ glide deviation |
| TACAN | r, $\mu$ polar coordinates |
| | giving the position of |
| | the aircraft with respect |
| | to beacons |

The sensor parameters are transmitted to the computation device 11 (link 27) which computes navigation parameters in the form of data relating the instantaneous status of the aircraft, these data being listed in table 3.

TABLE 2

| INFORMATION ELEMENTS ON THE INSTRUMENT PANEL | PANEL INSTRUMENTS |
| --- | --- |
| $\alpha$ incidence | incidence indicator |
| HRS radiosonde height | radio-altimetrical indicator |
| r, $\mu$ | TACAN indicator |
| $C_v$ true course | navigation indicator |
| r, $\mu$ position | (IDN) |
| drift due to wind | |
| $\Phi$, $\Theta$ attitudes | spherical indicator |
| $C_v$ true course | (ball) |
| $Z_h$ pressure altitude | altitude repeater |
| $V_p$ aerodynamic speed | machmeter |
| M MACH number | |
| $\frac{dH}{dt}$ tendency in the vertical plane | |
| different navigation parameters, including W route | control and navigation station (PCN) |
| $\|V\|$ ground speed | |
| $V_{wind}$ wind speed | |

TABLE 3

| | |
| --- | --- |
| $V_p$(air) | air speed |
| $V_{(ground)}$ | ground speed |
| $\Phi$, $\Theta$, $\alpha$ | attitudes of the aircraft |
| $\Omega$ | instantaneous speed of rotation vector |
| $\frac{dH}{dt}$ | tendency in the vertical plane |
| $\sigma$ | acceleration |
| | Z pressure altitude |
| H | altitude |
| | H height/ground |
| M | MACH number |
| $g_o$ | slope |
| $L_t$, $L_g$ | longitude and longitude (position of the aircraft) |
| $Z_{BI}$ | baro-inertial altitude |
| $\alpha$ | angle of incidence |
| $\Phi_v$, $\sigma_a$, $\beta_v$ | attitudes of the aircraft with respect to the air speed vector $V_p$ |

The navigation parameters are displayed by some of the onboard instruments 14 (link 28') and/or by one of the display -screens by means of the Symbol Generator Pack 12 (links 28 and 26). The elements contained in the rectangles 30 and 31 constitute the system of presentation of the piloting data as presently existing in modern aircraft, with the exception of the redundancy elements which are usually added to ensure the reliability of the data presented to the pilot.

The system, according to the invention, for ensuring the reliability of the piloting data comprises, firstly, the elements contained in the rectangles 32 and 33 which carry out checks on static consistency and, as the case may be, secondly, those contained in the rectangles 34 and 35 which carry out checks on dynamic consistency. For certain aircraft, the reliability of the information elements can be obtained to a sufficient degree by the static consistency checks alone. In this case, the aircraft will be fitted out solely with the corresponding elements 32, 33 but, for the other aircraft, it will be necessary to add the elements (34, 35) corresponding to the checks of dynamic consistency to obtain the required degree of reliability.

The static consistency checks are done first of all by computing the theoretical navigation parameters from the data of the display screens, and by comparing them with the navigation parameters given by the sensors, either by the computation device or by again by the onboard instruments to detect the inconsistencies and warn the pilots thereof.

The navigation parameters are used to compute the theoretical sensor parameters which are compared with the sensor parameters given by the sensors in order to detect inconsistencies if any and to warn the pilots thereof.

To carry out these computations and comparisons with a view to performing checks on static consistency, the system according to the invention includes a first computer 15 for computing the inverse function $F_1^{-1}$ of the function performed by the symbol generator box 12 from data and/or signals that are applied to the display screens (link 29) or are read on these screens (links 30' and 31' as well as a device 19).

The result of the computation of the inverse function $F_1^{-1}$ for each navigation parameter or sensor parameter is compared in a first comparator 16 with the same parameter given by the computing device 11 (link 32''') and/or the corresponding onboard instrument 14 (link 32') or the corresponding sensor (link 32''). When the results of the comparisons made in the first comparator 16 indicate that there is no equality, with a given precision, between the compared values of one and the same pair of parameters, an inconsistency signal is transmitted (link 36) to an alarm device 20 and to a computing device (link 36').

The navigation parameters given by the computing device 11 (link 32''') are applied to a second computer 17 to compute the inverse function $F_2^{-1}$ of the function performed by said computation device 11 so as to obtain the sensor parameters. These sensor parameters thus computed are compared in a second comparator 18 with the parameters given by the sensors 10 (link 35).

When an inconsistency signal is given by the comparator 16 to the second computer 17 (link 36'), the computation of the inverse function $F_2^{-1}$ for the concerned parameter is inhibited.

When the results of the comparisons made in the second comparator 18 indicate that there is no equality with a given level of precision, between the compared values of a same pair of parameters, an inconsistency signal is transmitted (link 37) to the alarm device 20.

The alarm may be of the sound, visual or other type and indicates the identity of the erroneous reticle or reticles or alphanumerical characters presented on the display in using, for example, a screen designed for this purpose or one of the display screens 13.

It can be understood that if the data from which the inverse function $F_1^{-1}$ is computed are those given by the symbol generator pack 12, the system according to the invention would not check the proper functioning of the display screens. Thus, according to the invention, the device 19 is designed to fulfil the inverse function $V^{-1}$ of the display screen, i.e. to determine the values of the parameters displayed on the basis of the that are symbols read.

Figure 3:
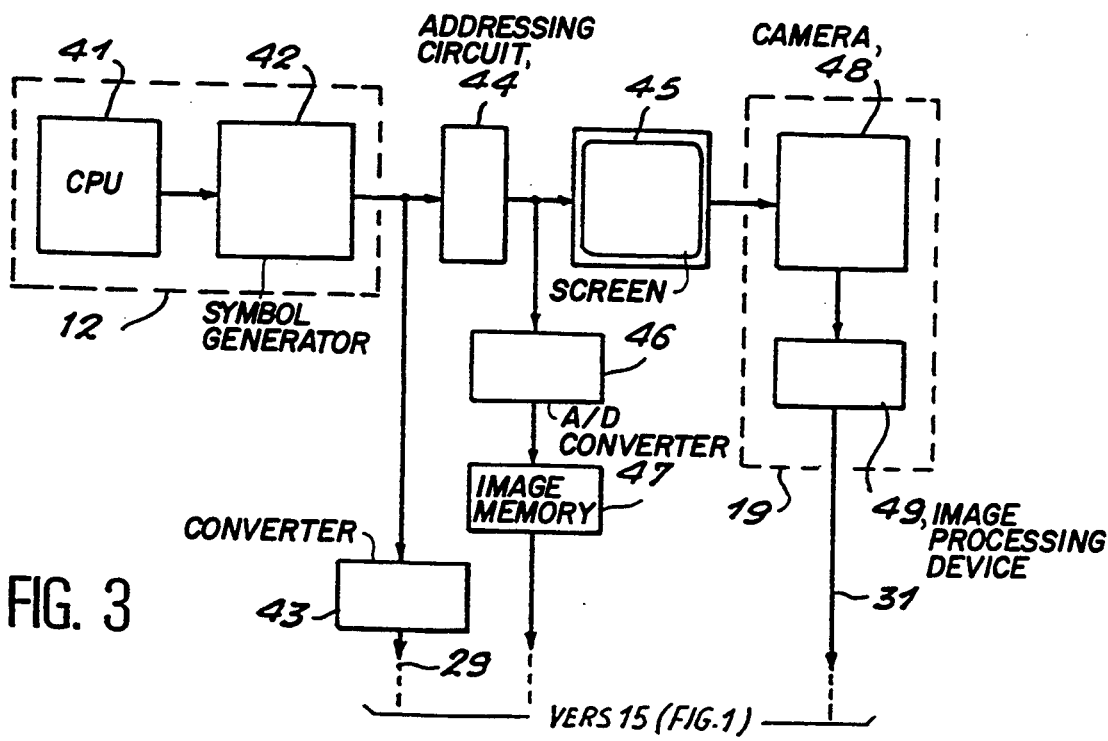
FIG. 3 is a functional diagram showing means that may be used to collect the signals and/or the data to which the conversions according to the present invention shall be applied.

It is also possible to implement an intermediate approach (not shown in FIG. 1) by digitizing the analog signals for the deflection and illumination of the display screen. The diagram of FIG. 3 shows the three approaches that may be implemented to obtain the data that will be used for the computation of the inverse function $F_1^{-1}$.

The symbol generator pack 12 includes a symbol generator 42 (FIG. 3) which contains the graphical definition of the alphanumerical characters and of the reticles and gives the signals that enable them to be made to appear on the screen. The generator 42 is under the control of a computer 41 which uses the navigation parameters to prepare the information elements to be displayed on the screen.

Figure 2:
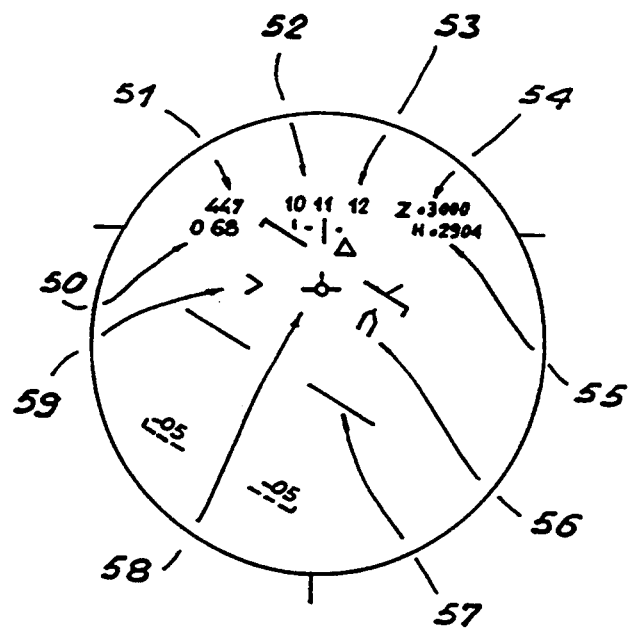
FIG. 2 illustrates an example of reticles that appear on a display screen and/or are projected before the pilot's eyes by an appropriate optical device.

As an illustration, FIG. 2 gives an example of a navigation configuration in which the following information elements appear:

the route reference 53,
the route error 56,
the horizon 57,
the speed vector 58,
the acceleration rate 59;
the alphanumerical characteristics:
the Mach number 50,
the speed in knots 51,
the course scale 52,
the pressure altitude,
the radiosonde height 55.

Depending on the type of display screen, whether of the matrix display or of the cathode-ray tube type, the symbol generator 42 gives either digital codes or analog signals for the deflection of the electron beam of the tube. The digital codes can be used directly by the first computer 15. By contrast, the analog signals have be converted into digital signals in a converter 43.

The data relating to the reticles and to the alphanumerical characters are displayed on a screen 45 by means of an addressing circuit 44. In the case of a cathode-ray tube, where the transmission line has to be checked up to the input of the tube, it is necessary to digitize the deflection signals by means of an analog/digital converter 46 before memorizing them in a digital memory 47 called an image memory. It is the codes contained in this memory that are used in the device 15 for the computing of the inverse function $F_1^{-1}$.

If the entire transmission line, including the screen 45, has to be checked, then it is necessary to film the screen by means of a camera 48 and process the images obtained in an image processing device 49 to determine the values of the digital characters and identify the geometry of the reticles in implementing shape recognition algorithms. This mode of processing images is described, for example, in the collection *Techniques de l'Ingenieur* ("The Engineer's Techniques"), volume H2, *Informatique-Langages-Systemes* ("Data Processing-Languages-Systems") and, more precisely, in the article H1900 by Jean-Paul HATTON, *Intelligence Artificielle et Reconnaissance des Formes* (Artifical Intelligence and Shape Recognition) and in the article H1920 by Claude FAURE, *Intelligence Artificielle, Reconnaissance des Formes* (Artifical Intelligence, Shape Recognition).

From the recognized and identified values of the reticles and digital values appearing on the screen, the computing device 15 computes the navigation parameters to which they correspond while the computing device 17 computes the sensor parameters. The table 4 summarizes the correspondence between the reticles and the navigation and sensor parameters.

TABLE 4

| RETICLES | NAVIGATION PARAMETERS | | SENSOR PARAMETERS |
| --- | --- | --- | --- |
| HORIZON | $\Phi, \Theta$ | attitudes in aircraft axes | |
| | $V_{ground}$ | ground speed vector | |
| | W | route | |
| | $V_{air}$ | air speed vector $V_p = \|\text{air}\|$ $V_{wind} = V_{ground} - V_{air}$ | |
| HEIGHT | HRS | radiosonde height | |
| | $\epsilon_l, \epsilon_g$ | loc and glide deviations | |
| | $\Phi, \Theta$ | attitudes | |
| COURSE REFERENCE | $\beta$ | azimuth | |
| | $C_v$ | true course (with $\beta_{vo}$) | |
| | $V_{ground}$ | | |
| | $V_{air}$ | | |
| | W | route | |
| INCIDENCE | $V_{air}$ | | |
| | $V_{ground}$ | for $Z_h < 6{,}000$ m and $Z_h > 4{,}500$ m | |
| | $\alpha$ | incidence (with RHF) | |
| SPEED VECTOR | $V_{ground}$ | ground speed vector | |
| | $V_{air}$ | air speed vector | |
| | W | route | |
| PRESSURE ALTITUDE | M | Mach number | $P_s$ static pressure |
| | $Z_{baro}$ | $Z_{baro}$ reset $dZ/dt$ } with QNH | |
| MACH NUMBER | M | Mach number | $P_s$ and $\delta P$ static and dynamic pressures |
| CONVENTIONAL SPEED | $V_c$ | Conventional speed | $P_s$ and $\delta P$ $T_S$ static temperature (with M) |
| ACCELERATION ON TRAJECTORY | $T_a$ dV/dt | Rate of acceleration on trajectory derivative of speed | |
| SYNTHETIC RUNWAY | | | $\epsilon_l, \epsilon_g$ loc and glide deviations |
| | $C_v$ | True course | |
| | $\Phi, \Theta, \beta$ | Aircraft attitudes | |
| | $\Phi_v, \sigma_a, \beta_v$ | aerodynamic attitudes (with $\alpha$) | |

The navigation parameters and the sensor parameters may be obtained from one or more reticles, thus enabling an increase in the number of checks for one and the same parameter and, thereby, an increase in the level of ensuring the reliability of the data and reticles presented.

Table 5 gives an indication, per navigation parameter, of the groups of reticles that should or may be used in its computation by the inverse function $F_1^{-1}$.

Similarly, table 6 gives an indication, per sensor parameter, of the navigation parameters or the groups of navigation parameters that should or may be used in its computation by the inverse function $F_2^{-1}$. The equations for computing the functions $F_1^{-1}$ and $F_2^{-1}$ shall be described in greater detail here below.

As already indicated here above, the results of the commutation of the inverse function $F_1^{-1}$ are compared in a comparator with the navigation parameters given by the computing device 11, the corresponding onboard instrument 14 or the corresponding sensor so as to detect the inconsistencies.

TABLE 5

| NAVIGATION PARAMETER | COMPUTATION ENABLING IT TO BE OBTAINED (number) | RETICLES USED | COMPLEMENTARY S.G.P. PARAMETERS NECESSARY |
|---|---|---|---|
| $\Phi, \Theta, \beta$ aircraft attitudes | $a_1$ | reference horizon of this course | $\beta_{vo}$ |
|  | $a_2$ | synthetic runway HRS = H | $\beta_{vo}$ parameters of the runway |
| $\Phi_v, \sigma_a, \beta_v$ aerodynamic attitudes | $b_1$ | incidence | $\Phi, \Theta, \beta$ |
| M mach | $C_1$ | Mach number |  |
|  | $C_2$ | Conventional speed $V_c$ Pressure altitude $Z_h$ | QNH |
|  | $C_3$ |  | $V_{wind}, V_{ground}$ $T_S$ |
| $Z_h$ reset pressure altitude | $d_1$ | pressure altitude |  |
| $V_p$ air speed vector | $e_1$ |  | $V_{wind}, V_{ground}$ |
|  | $e_2$ | horizon incidence course | $V_{wind}, V_{ground}$ giving $V_p$ $\beta_{vo}$ |
| $(Z_h > 6,000\ m)$ | $e_3$ | speed altitude incidence horizon course | $V_{wind}, V_{ground}$ giving $V_{px}$ orientation of the display in the aircraft $\beta_{vo}$ |
| $V_{ground}$ ground speed vector | $f_1$ |  | $V_{ground}$ |
| $(Z_h < 4,500\ m)$ | $f_2$ | speed vector horizon course altitude | $V_x$ of $V_{ground}$ $\beta_{vo}$ orientation of the display in the aircraft |
| $V_{ground}$ ground speed vector | $f_3$ | speed vector horizon course | $V_{ground}, V_{wind}$ giving $V_p$ |
| $(4,500\ m < Z_h < 6,000\ m)$ |  | incidence route altitude | $\beta_{vo}$ orientation of the display in the aircraft |
| $(Zh > 6,000\ m)$ | $f_4$ | route slope altitude | $V_x$ of $V_{ground}$ |
| $(Zh > 6,000\ m)$ | $f_5$ | slope altitude | $V_x, V_y$ of $V_{ground}$ |
| $(Zh > 6,000\ m)$ | $f_6$ | speed vector altitude horizon incidence course | $V_p$ $V_x, V_y$ of $V_{ground}$ $\beta_{vo}$ orientation of the display in the aircraft |
| W route | $g_1$ | route |  |
|  | $g_2$ | speed vector horizon course | orientation of the display in the aircraft $\beta_{vo}$ |
| $T_a$ rate of acceleration on trajectory | $h_1$ $h_2$ | acceleration on trajectory | $V_{ground}$ |
| $\epsilon_l, \epsilon_g$ loc and glide | $i_1$ | synthetic runway HRS | parameters of the runway |

TABLE 5-continued

| NAVIGATION PARAMETER | COMPUTATION ENABLING IT TO BE OBTAINED (number) | RETICLES USED | COMPLEMENTARY S.G.P. PARAMETERS NECESSARY |
|---|---|---|---|
| deviations | | | |

TABLE 6

| SENSOR PARAMETERS | COMPUTATION ENABLING IT TO BE OBTAINED (number) | NECESSARY SGP PARAMETERS |
|---|---|---|
| $P_S$, $\delta P$ Pressures static dynamic | $k_1$ | conventional speed $V_c$ Mach number |
| | $k_2$ | conventional speed $V_c$ $V_{wind}$, $V_{ground}$ giving $V_p$ $T_S$ |
| $T_S$ | $l_1$ | pressure altitude $Z_h$ QNH |
| | $l_1$ | Mach $V_{ground}$, $V_{wind}$ giving $V_p$ |

TABLE 7

ONBOARD INSTRUMENTS

| | |
|---|---|
| BALL | $\Phi$, $\Theta$, $C_v$ |
| MACHMETER | M, $V_I$ (enables the computation of $V_c$) |
| ALTITUDE REPEATER | $Z_h$ |
| VERTICAL SPEED INDICATOR | dZ/dt |
| PCN | W, $\|V_{ground}\|$, $V_{wind}$ |
| IDN | $C_v$, $V_{wind}$ |
| RADIO-ALTIMETER | HRS |

Table 7 summarizes the correspondence existing between the onboard board instruments and the parameters that they display.

The computation of the inverse functions $F_1^{-1}$ and $F_2^{-1}$ for each parameter considered is achieved by means of equations that result from the application of the laws of flight mechanics and of aerodynamics.

For a clear understanding of the computations of the inverse functions $F_1^{-1}$ and $F_2^{-1}$ tables 8 and 9 summarize the notations and definitions of the parameters of the aircraft.

TABLE 8

| | |
|---|---|
| $R_o$ (O, $X_o$, $Y_o$, $Z_o$) | Absolute Galilean Reference System |
| $R'_o$ (G, $X_o$, $Y_o$, $Z_o$) | Reference System $R_o$ shifted to center of gravity of the aircraft |
| R (G, X, Y, Z) | Reference related to the aircraft |
| $R_a$ (G, $X_a$, $Y_a$, $Z_a$) ($\Phi,\Theta,\beta$) and ($\Phi_v$, $\sigma_a$, $\beta_v$) | Aerodynamic reference system Respective attitudes of the aircraft and of the air-path axis system in the reference system $R_o$ |
| $V_p$ = ($V_{px}$, $V_{py}$, $V_{pz}$) | air speed = aerodynamic speed of the aircraft = speed of the aircraft with respect to the air (in the absolute reference system) |
| V = $V_{ground}$ = ($V_x$, $V_y$, $V_z$) | ground speed = speed of the aircraft with respect to the ground (in the absolute reference system) |
| $V_{wind}$ = ($V_{windx}$, $V_{windy}$) $V_{windz}$ | speed of the wind (in the absolute reference system) |

TABLE 8-continued

| | |
|---|---|
| $\alpha$ | incidence of the aircraft = angle between the air speed vector and the aircraft axis in the aircraft plane of symmetry |
| $V_C$ | Conventional speed |
| $V_I$ | Indicated speed |
| $g_o$ | Slope of the aircraft = angle between the ground speed vector and its projection in the horizontal plane |
| $P_S$ | static pressure = pressure of the atmosphere outside the flow |
| $P_T$ | total pressure = pressure exerted on an object plunged into the streamline flow |
| $\delta P$ | dynamic pressure: $P_S - P_T$ |
| $Z_p$ | pressure altitude |
| $Z_h$ | reset pressure altitude |
| $T_S$ | Static temperature = temperature of the atmosphere outside the flow |
| $T_T$ | total temperature = of temperature an object plunged into the flow |

TABLE 9

PARAMETERS INTENDED TO APPEAR ON THE DISPLAY

| | |
|---|---|
| V' = (V'$_x$, V'$_y$, V'$_z$) | speed prepared by the SGP, the direction of which will be shown by a reticle of the display, expressed in the absolute reference system |
| $V_v$ = ($V_{vx}$, $V_{vy}$, $V_{vz}$) | speed prepared by the SGP, the direction of which will be shown by a reticle of the display, expressed in the aircraft reference system |
| $Y_v$, $Z_v$ | "coordinates" of the speed vector reticle in the visor |
| $C_v$ | geographical course given by the inertial system. |
| $C_{gm}$ | magnetic course given by the flux valve |
| $\beta_{vo}$ | angle of the Northern axis in the absolute reference system |
| W = Rs | route of the aircraft (as given on the display) |
| $T_a$ | acceleration on trajectory as given in the visor |
| PPOTREL | potential slope of the aircraft or total slope |
| $\Phi$, $\Theta$ | horizon |
| HRS | radiosonde height |
| $Z_h$ | reset pressure altitude |
| M | mach number |
| $V_I$ | indicated speed. |

(a) COMPUTATION OF AIRCRAFT ATTITUDES $\alpha$, $\Theta$, $\beta$

As indicated in tables 4 and 5, the attitudes $\Phi$, $\Theta$ and $\beta$ of the aircraft may be obtained from:

either the HORIZON and COURSE REFERENCE reticles (computation a1)
or the SYNTHETIC RUNWAY and HRS reticles in the event of landing or approach (computation a2).

Figure 4:
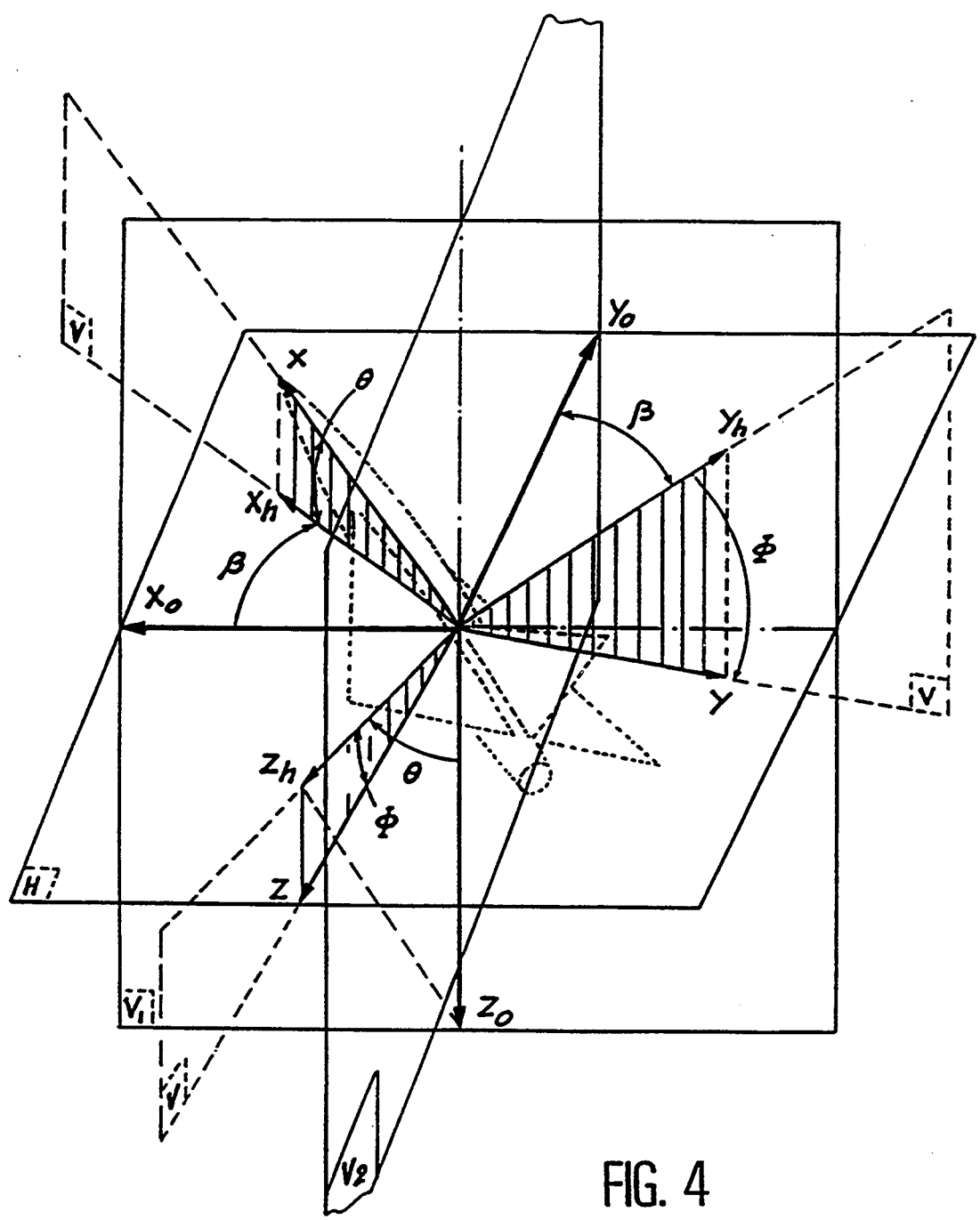
FIG. 4 is a geometrical diagram showing the different reference axes and the angles $\sigma$, $\alpha$ and $\Theta$ of an aircraft.

The attitudes of the aircraft with respect to the axes of the aircraft are defined by the following angles:

$\Phi$ for the roll
$\Theta$ for the longitudinal attitude (pitch)
$\beta$ for the azimuth as shown in the drawing of FIG. 4.

In this drawing of FIG. 4:

$\beta$ is the angle formed between the axis $X_o$ and the projection of the axis X in the horizontal plane passing through $X_o$; in the rotation of the axis $X_o$ and of the angle $\beta$, Y is transformed into $Y_h$;

$\Theta$ is the angle formed between the axis X and the projection $X_h$ of the axis X in the horizontal plane passing through $X_o$; in the rotation of the axis $Y_h$ and of the angle $\Theta$, $Z_o$ is transformed into $Z_h$;

$\Phi$ is the angle formed by Z with $Z_h$ and Y with $Y_h$.

Computation a1

Figure 5A:
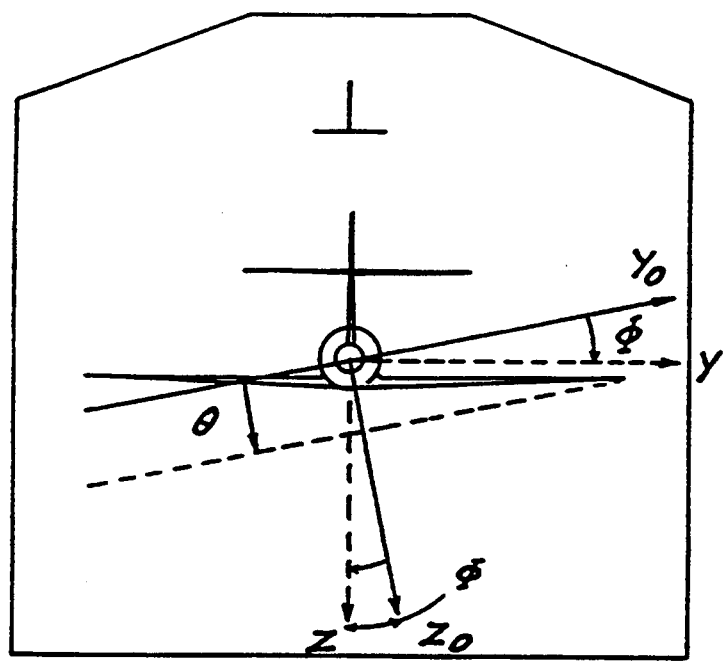
FIGS. 5-a, 5-b and 5-c show the angles $\alpha$, $\Phi$ and $\Theta$ of an aircraft.
Figure 5B:
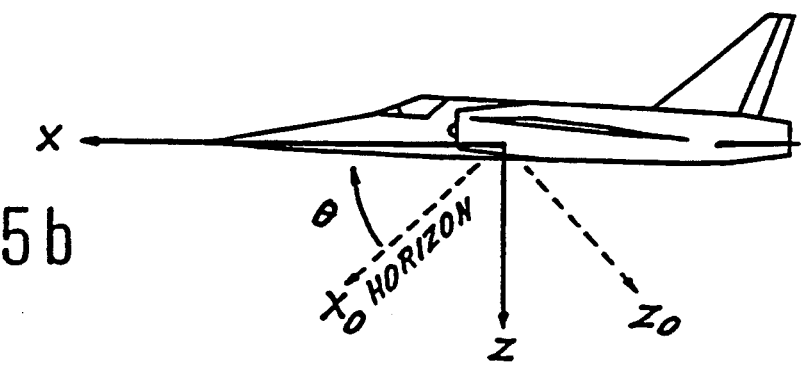
Figure 5C:
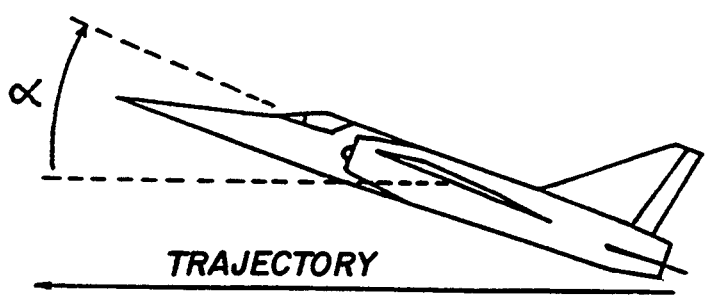

The angles $\Phi$ and $\Theta$ are given directly by the reticle HORIZON (FIGS. 5, 5-a and 5-b) and therefore do not have to be computed. The angle $\beta$ is obtained from the COURSE REFERENCE by subtraction of the angle $\beta_{vo}$ between the North and the axis $X_o$ from the absolute reference chosen.

Computation a2

From the SYNTHETIC RUNWAY RETICLE (FIG. 6-a) in the approach phase, the value of HRS, and the parameters of the runway of $\beta_{vo}$, it is also possible to compute $\beta$ and $\Theta$ by the following formulae:

$$\beta = \beta_v + C_o - GF + \epsilon_1$$

$$\Theta = SE - g_o + \epsilon_g$$

In these formulae,

GF and SE are given by the SYNTHETIC RUNWAY reticle (FIG. 6-a)
$\epsilon_1$ is the angle between the axis of the runway and the aircraft-runway direction,
$g_o$ is the slope controlled at entry to the runway,
$C_o$ is the angle between the geographic North and the axis of the runway,
these two parameters $g_o$ and $C_o$ are characteristic parameters of the runway,
$\epsilon_g$ is the angle between the slope controlled go at entry to the runway and the real slope of the aircraft,
these two parameters $\epsilon_1$ and $\epsilon_g$ are computed from the geometrical dimensions determined on the SYNTHETIC RUNWAY RETICLE, the radioprobe height HRS and the characteristic parameters of the runway.

Figure 6:
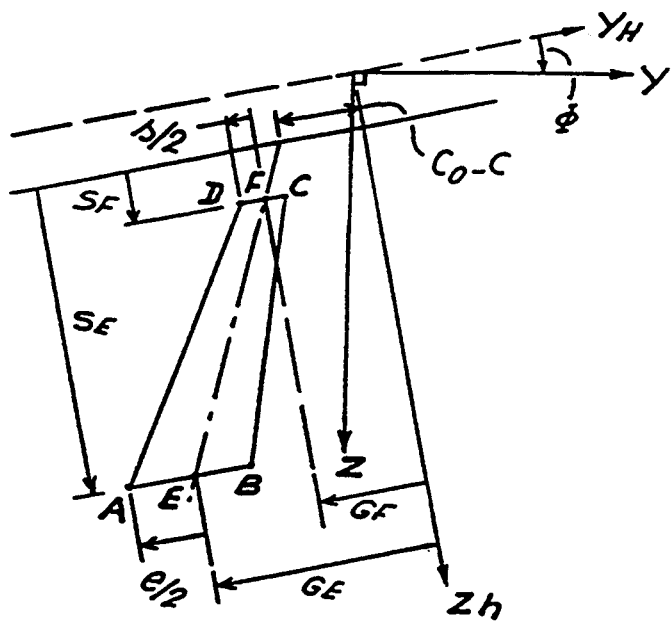
FIGS. 6-a, 6-b, 6-c and 6-d are geometrical drawings showing the angles that are used for landing by instruments.
Figure 6:
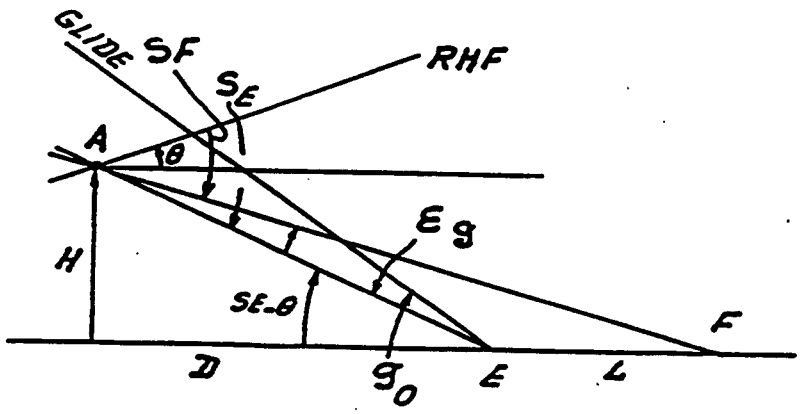
Figure 6:
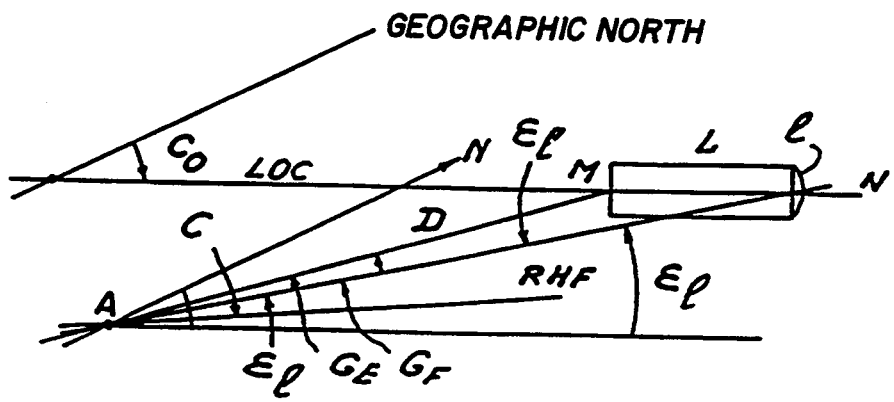
Figure 6:
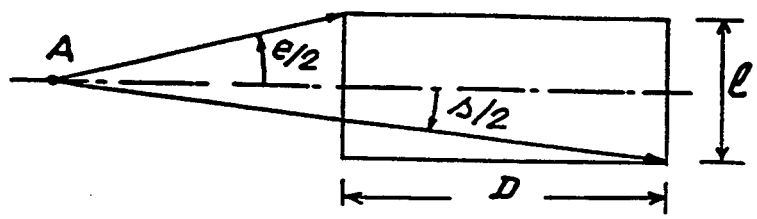

FIGS. 6-b, 6-c and 6-c show the different angles and lengths taken into account to arrive at the SYNTHETIC RUNWAY reticle, FIG. 6-b showing the I.L.S. and real angles of descent of the aircraft in a vertical plane and FIG. 6-c showing the I.L.S. and real angles of direction of the aircraft in a horizontal plane.

From FIGS. 6-a, 6-b and 6-c, we may derive:

$$\epsilon_g = \frac{eH g_o}{l}$$

and $$\epsilon_l = \frac{H(GE - GF)}{L(g_o + \epsilon_g)}$$

e, GE and GF are determined from the geometry of the SYNTHETIC RUNWAY reticle (FIG. 6-a),
H=HRS is the radioprobe height,
L and 1 are respectively the width and length of the runway, i.e. the characteristic parameters of the runway.

(b) COMPUTATION OF THE AERODYNAMIC ATTITUDES $\Phi_v$, $\sigma_a$ and $\beta_v$ The attitudes $\Phi_v$, $\sigma_a$ and $\beta_v$ of the aerodynamic reference system with respect to the absolute reference system are computed (in only one computation b1) from the INCIDENCE reticle giving the angle $\alpha$ and from the parameters $\Phi$, $\Theta$ and $\beta$ by means of the following equations:

$$\tan \Phi_v = \frac{\cos\Theta\sin\Phi}{\sin\Theta\sin\alpha + \cos\Phi\cos\Theta\cos\alpha}$$

$$\sin \sigma_a = \sin\Theta\cos\alpha - \cos\Phi\cos\Theta\sin\alpha$$

$$\tan \beta_v = \frac{\cos\Theta\sin\beta\cos\alpha + (\sin\beta\sin\Theta\cos\Phi - \cos\beta\sin\Phi)\sin\alpha}{\cos\Theta\cos\beta\cos\alpha + (\cos\beta\sin\Theta\cos\Phi + \sin\beta\sin\Phi)\sin\alpha}$$

(c) COMPUTATION OF THE MACH NUMBER M

In accordance with table 5, three methods of computation c1, c2 and c3 can be used to obtain the Mach number M. The first method c1 consists in making direct use of the reading on the corresponding reticle. The second method c2 consists in using the CONVENTIONAL SPEED reticle $V_c$ and the PRESSURE ALTITUDE reticle $Z_h$ as well as the information QNH. Finally, the third method c3 consists in using the parameters: $V_{wind}$, $V_{ground}$ and $T_s$

Computation c1

Direct reading of the corresponding reticle.

Computation c2

Use of the CONVENTIONAL SPEED and PRESSURE ALTITUDE reticles and of the information element QNH.

The following relationships:
in subsonic flight:

$$\frac{\delta P}{P_s} = [1 + 0.2M^2]^{3.5} - 1$$

in supersonic flight:

$$\frac{\delta P}{P_s} = \frac{\left[\frac{(\tau + 1)}{2} M^2\right]^{\frac{\tau}{\tau - 1}}}{[1 + 2\tau/(\tau + 1)(M^2 - 1)]^{\frac{1}{\tau - 1}}} - 1$$

can be used to determine the Mach number if the pressures $\delta p$ and $P_S$ are known.

$\delta p$ is deduced from the conventional speed $V_c$ by the relationships:

in subsonic flight:

$$\frac{\delta P}{P_o} = \left[ 1 + 0{,}2 \frac{(V_c)^2}{(a_o)^2} \right]^{3,5} - 1$$

in supersonic flight:

$$\frac{\delta P}{P_o} = \frac{\left[ \frac{\tau + 1}{2} \frac{(V_c)^2}{(a_o)^2} \right]^{\frac{\tau}{\tau-1}}}{\left[ 1 + \frac{2\tau}{\tau+1} \left[ \frac{(V_c)^2}{(a_o)^2} - 1 \right] \right]^{\frac{1}{\tau-1}}} - 1$$

in which:
$P_o = 1{,}013.15$ millibars (pressure reduced to sea level)
$a_o = 661$ knots (speed of sound at sea level)
$\tau = 1.40$ is the ratio $C_p/C_v$ for a Mach number of less than 2.
$P_S$ is deduced from the pressure altitude reset by the QNH ($Z_p = Z_h + QNH$) by the relationship:

$$P_s = P_{so} \left[ \frac{(288 - 6{,}5 Z_p)}{288} \right]^{5,25}$$

in which $P_{so} = 1{,}013.15$ millibars.

Computation c3

Use of the parameters $V_{wind}$, $V_{ground}$ and $T_S$ $V_{wind}$ and $V_{ground}$ enable the computation of $V_p$ by $V_p = \| \vec{V}_{wind} - \vec{V}_{ground} \|$ and M is then given by the relationship:

$$M = \frac{V_p}{k(T_S)^{\frac{1}{2}}}$$

with $K = 40.1$ m/s

(d) COMPUTATION OF RESET PRESSURE ALTITUDE $Z_h$

The parameter $Z_h$ is obtained directly by the duplication of the ALTITUDE reticle (only one computation d1).

(e) COMPUTATION OF THE AERODYNAMIC SPEED VECTOR $V_p$

This may be obtained in three different ways:
e1: from the parameters $V_{wind}$ and $V_{ground}$
e2: from the HORIZON ($\Phi, \Theta$), INCIDENCE $\alpha$ and COURSE REFERENCE ($C_v$) and from the parameters $V_p$ and $\beta_{vo}$.
e3: from the SPEED ($Y_v$ and $Z_v$), ALTITUDE ($Z_h$), INCIDENCE ($\alpha$), HORIZON and COURSE reticles for $Z_h > 6000$ meters, the parameters $V_{px}$, $\beta_{vo}$ and the orientation of the display in the aircraft.

Computation e1

The aerodynamic speed vector $V_p$ may be obtained by the vector combination of the vector $V_{speed}$ and the vector $V_{ground}$ according to the equation:

$V_p = V_{ground} - V_{wind}$

Computation e2

The aerodynamic speed vector $V_p$ in the reference system $R_o$ may also be obtained from the standard of the aerodynamic speed $V_p$ by the following matrix transformation:

$$(V_p)_{R_o} = \begin{bmatrix} \cos\sigma_a \cos\beta_v \\ \cos\sigma_a \sin\beta_v \\ -\sin\sigma_a \end{bmatrix} V_p$$

it being known that the angles $\sigma_a$ and $\beta_v$ may be expressed as a function of $\Phi$, $\Theta$ and $\beta_{vo}$ of the HORIZON and COURSE reticles and of $\alpha$ as indicated in the computation (b) above.

Computation e3

When the altitude $Z_h$ is over 6000 meters, the aerodynamic speed vector $V_p$ may be obtained from the reticles:

—SPEED VECTOR $Y_v$

INCIDENCE $\alpha$

HORIZON $\Phi$, $\Theta$ and $\beta$

ALTITUDE and of the parameter $V_{px}$ which is the component of $V_p$ along the X axis in the reference system $R_o$. This computation therefore consists in computing the other components $V_{py}$ and $V_{pz}$.

Thus, if we take the following notations:

$(V_{px}, V_{py}, V_{pz})$: coordinates of $V_p$ in the terrestrial reference system $R_o$ $(V'_{px}, V'_{py}, V'_{pz})$: coordinates of $V_p$ in the aircraft reference system $(V_{vx}, V_{vy}, V_{vz})$: coordinates of $V_p$ in the visor reference system We can write:

$(V_{px}, V_{py}, V_{pz}) = B(V_{vx}, V_{vx}, V_{vz})$ where B is the matrix of passage from the terrestrial reference system to the display reference system, i.e. the product of the matrix of passage from the terrestrial reference system to the aircraft reference system ($\Phi$, $\Theta$, $\beta$) by the matrix of passage from the aircraft reference system to the display reference system, which results from the orientation of the display.

We can write:

$(V_{px}, V_{vy}, V_{pz})$: $BV_{vx}(1, V_{vy}/V_{vx}, V_{vz}/V_{vx}) = BV_{vx}(1, Y_v, Z_v)$

The result thereof is that if:
$V_{px}$ is known by assumption,
$\Phi$, $\Theta$ and $\beta$ are determined from the HORIZON and COURSE RETICLES and from $\beta_{vo}$.

The orientation of the display in the aircraft is known; it is possible to compute $V_{yx}$. This enables the computation of $V_{py}$ by means of $Y_v$ and of the matrix B known by assumption; finally, $V_{px}$ and $V_{py}$ being known, the third component $V_{pz}$ is determined by resolving the following equation where the incidence $\alpha$ known by assumption comes into play:

$$\frac{1}{\tan\alpha} = \frac{V_{py}(\cos\Phi\sin\Theta\sin\beta - \sin\Theta\cos\beta) + V_{pz}\cos\Phi\cos\Theta}{V_{px}\cos\Theta\cos\beta + V_{py}\cos\Theta\sin\beta - V_{pz}\sin\Theta} + \frac{V_{px}(\cos\Phi\sin\Theta\cos\beta + \sin\Phi\sin\beta)}{V_{px}\cos\Theta\cos\beta + V_{py}\cos\Theta\sin\beta - V_{pz}\sin\Theta}$$

(f) COMPUTATION OF THE SPEED VECTOR $V_{ground}$

Table 5 shows six different ways (f1 to f6) for the computation of the speed vector with respect to the ground $V_{sol}$ in taking account, notably, of the altitude $Z_h$ depending on whether said altitude is:
- below 4500 meters
- from 4500 meters to 6000 meters
- above 6000 meters.

Computation f1

The first way consists in using the information given by the symbol generator pack.

Computation f2

The second way consists in the computation, when $Z_h < 4,500$ meters, of the components $V_x$, $V_y$ and $V_z$ of the speed vector $V_{ground}$ in the absolute reference system by the following matrix equation:

$$\begin{pmatrix} V_x \\ V_y \\ V_z \end{pmatrix} = B \begin{pmatrix} V_{vx} \\ V_{vy} \\ V_{vz} \end{pmatrix}$$

where B is the matrix of passage from the absolute reference system to the display reference system, i.e. the product of the matrix of passage from the absolute reference system to the aircraft reference system given by $\Phi$, $\Theta$ and $\beta$) by the matrix of passage from the aircraft reference system to the display reference system, given by the orientation of the visor in the aircraft, which gives:

$$\begin{pmatrix} V_x \\ V_y \\ V_z \end{pmatrix} = B \begin{pmatrix} 1 \\ Y_v \\ Z_v \end{pmatrix}$$

where $Y_v = V_{vy}/V_{vx}$ and $Z_{vz} = V_{vz}/V_{vx}$ are the coordinates of the speed reticle.

The knowledge of $V_x$ and of the matrix B, obtained through $\Phi$, $\Theta$ and $\alpha$ coming from the HORIZON and COURSE reticles and the parameter $\beta_{vo}$ and through the orientation of the display in the aircraft, then enables the computation of $V_{vx}$, then of $V_y$ and $V_z$ through $Y_v$ and $Z_V$.

Computation f3

The components $V_x$, $V_y$ and $V_z$ of the speed vector $V_{ground}$ are given by:

$$V_x = \frac{qV_1 - q(Z_h)V_p\cos\sigma_a\cos\beta_v}{1 - q(Z_h)}$$

$$V_y = \frac{qV_2 - q(Z_h)V_p\cos\sigma_a\sin\beta_v}{1 - q(Z_h)}$$

$$V_z = V_3 \left[ \frac{V_x^2 + V_y^2}{V_1^2 + V_2^2} \right]^{\frac{1}{2}}$$

where:

$$q = \frac{q(Z_h)V_p(\tan W\cos\sigma_a\cos\beta_v - \cos\sigma_a\sin\beta_v)}{1 - q(Z_h)}$$

a formula in which:
- $q(Z_h)$ is a coefficient that varies from the value zero for $Z_h < 4,500$ meters to the value 1 for $Z_h > 6,000$ meters according to a linear curve.
- $V_p$ is the speed in relation to the air, known by assumption;
- $\sigma_a$ and $\beta_v$ are deduced from $\Phi$, $\Theta$ and $\beta = C + \beta_{vo}$ determined from the HORIZON and COURSE reticles with the parameter $\beta_{vo}$ according to the computation (b) and the incidence $\alpha$.
- W is the route of the aircraft given by the ROUTE reticle.
- $V_1$, $V_2$, $V_3$ are the coordinates of the vector $$B \begin{pmatrix} 1 \\ Y_v \\ Z_v \end{pmatrix}$$

where $Y_v$ and $Z_v$ are the coordinates of the SPEED reticle in the display reference and B is the matrix of passage from the absolute reference system to the display reference system, i.e. the product of the matrix of passage from the absolute reference system to the aircraft reference system (given by $\Phi$, $\Theta$ and $\beta$) and the matrix of passage from the aircraft reference system to the display reference system, given by the orientation of the display in the aircraft,

Computation f4

When $Z_h$ is above 6,000 meters and when $V_x$, the route W and the slope g are known, we get:

$$V_y = \frac{\tan W}{V_x}$$

then $$V_Z = \sin g_o(V_x^2 + V_y^2 + V_z^2)^{\frac{1}{2}}$$

Computation f5

When $Z_h$ is above 6,000 meters and when $V_x$, $V_y$ and the slope go are known, the third component $V_z$ is obtained by the above formula.

Computation f6

When $Z_h$ is above 6,000 meters and when the following are known:
- $\Phi$, $\Theta$, $\beta$ of the aircraft by means of the HORIZON reticle and the orientation of the display in the aircraft, $Y_v$, $Z_v$, the coordinates of the SPEED reticle,
$\alpha$, the incidence
$V_p$ the norm of the speed in relation to the air, it has been seen by computation (e3) that it is possible to compute the coordinates of the air speed vector $V_{px}$, $V_{py}$ and $V_{pz}$ in applying the relationship:

$$V_z = V_{pz} \left[ \frac{V_x^2 + V_y^2}{V_{px}^2 + V_{py}^2} \right]^{\frac{1}{2}}$$

where $V_x$ and $V_y$ of $V_{ground}$ are assumed to be known.

The coordinates $V_x$, $V_y$ and $V_z$ of $V_{ground}$ are therefore deduced therefrom.

(g) COMPUTATION OF THE ROUTE W

Computation g1

When the route W is given by the corresponding reticle, it is sufficient to duplicate this value.

Computation g2

The route W may be computed from $Y_v$ and $Z_v$ given by the SPEED reticle and from (a), (b), (c) which is the matrix of passage from the absolute reference to the display reference, expressed in the absolute reference. It is the product of the matrix of passage from the absolute reference to the aircraft reference, given by ($\Phi$), ($\Theta$) and ($\alpha$) coming from the HORIZON and COURSE reticles and from $\beta_{vo}$, by the matrix of passage from the aircraft reference to the display reference given by the orientation of the display in the aircraft.

The route W is then expressed by tan W which is equal to:

$$\tan W = \frac{O + P + Q}{R + S + T}$$

with
O = cosbsinc
P = $Y_v$(sincsinbsina + cosccosa)
Q = $Z_v$(cosasinbsinc − sinacosc)
R = cosbcosc
S = $Y_v$(coscsinbsina − sinccosa)
T = $Z_v$(cosasinbcosc + sinasinc)

(h) COMPUTATION OF THE ACCELERATION $T_a$

Computation h1

When the ground speed vector $V_{ground}$ is known, $T_a$ is obtained by computing the derivative $\frac{1}{g} dV/dt$, that is:

$$\frac{1}{g} \frac{d}{dt} [V_x^2 + V_y^2 + V_z^2]^{\frac{1}{2}} = \frac{1}{gV} \left[ V_x \frac{dV_x}{dt} + V_y \frac{dV_y}{dt} + V_z \frac{dV_z}{dt} \right]$$

Computation h2

When the ACCELERATION ON TRAJECTORY reticle is available, it is sufficient to read the value that it indicates.

(i) COMPUTATION OF DESCENT ERRORS $\delta_l$ AND $\delta_g$

The computation i1 is done from:
the characteristic parameters of the runway which are:
  l = width of the runway
  L = length of the runway
  $g_o$ = slope controlled at entry to runway
and from information elements determined from the geometry of the SYNTHETIC RUNWAY reticle (GE, GF)
and from H = HRS, radioprobe height, in using the following formulae:

$$\epsilon_g = \frac{eHg_o}{l}$$

and $$\epsilon_l = \frac{H(GE - GF)}{L(g_o + \epsilon_g)}$$

(k) COMPUTATION OF STATIC PRESSURE ($P_S$) AND DYNAMIC PRESSURE ($\delta_p$)

This computation may be done in two different ways, either from the conventional speed $V_c$ and the Mach number M (computation k1) or from the conventional speed $V_c$, the air speed $V_p$ and the temperature $T_s$ (computation k2).

Computation k1

From $V_c$ and M

To this end, it is necessary to resolve the following system of equations:

$$\frac{\delta P}{P_o} = \left[ 1 + 0.2 \frac{(V_c)^2}{(a_o)^2} \right]^{3,5} - 1$$

$$\frac{\delta P}{P_s} = [1 + 0.2M^2]^{3,5} - 1$$

in supersonic flight:

$$\frac{\delta P}{P_o} = \frac{\left[ \frac{\tau + 1}{2} \frac{(V_c)^2}{(a_o)^2} \right]^{\frac{\tau}{\tau - 1}}}{\left[ 1 + \frac{2\tau}{\tau + 1} \left[ \frac{(V_c)^2}{(a_o)^2} - 1 \right] \right]^{\frac{1}{\tau - 1}}} - 1$$

$$\frac{\delta P}{P_s} = \frac{\left[ \frac{\tau + 1}{2} M^2 \right]^{\frac{\tau}{\tau - 1}}}{[1 + 2\tau/(\tau + 1)(M^2 - 1)]^{\frac{1}{\tau - 1}}} - 1$$

In these formulae:
$P_o$ = 1013.15 millibars is the pressure reduced to sea level,
$a_o$ is the speed of sound at sea level, i.e., 661 knots; $\tau$ is the ratio $C_p/C_v$ = 1.40 for air and M < 2.

Computation k2

From $V_c$, $V_p$ and $T_s$ since $V_p = a.M$, with "a" the speed of sound and since $a = k\sqrt{T_s}$ with $k = 40.1$ m/s it can be written that $$M = \frac{V_p}{k\sqrt{T_s}}$$

Besides, the equations of the above paragraph show that:

$\delta P/P_s = f(M)$ and that $\delta P/P_o = f(V_c/a_o)$,

The result thereof is that it is possible to compute $P_s$ and $\delta P$ knowing $V_c$, $V_p$ and $T_s$.

(m) COMPUTATION OF THE TEMPERATURE $T_S$

Computation of m1

This computation is done from the pressure altitude $Z_h$ and from the QNH by the formula:

$$P_s = P_{so}\left[\frac{(288 - 6.5 Z_p)}{288}\right]^{5.25}$$

with $P_{so} = 1013.15$ millibars, the standard pressure at sea level and $Z_p = Z_h + QNH$.

Computation m2

This computation is done from the Mach number M and from the speed $V_p$ by the formula:

$$T_s = \left[\frac{V_p}{kM}\right]^2$$

The detailed description that has just been given shows that one and the same parameter may be computed from different groups of reticles and alphanumeric characters without a role being played by this parameter in the preparation of said reticles and characters. This enables checks of one and the same parameter to be made in many ways, thus increasing the degree to which reliability is ensured.

The checks based on the computation of the inverse functions $F_1^{-1}$ and $F_1^{-1}$ constitute checks of static consistency, i.e. checks that do not bring the changing situation of the aircraft into play.

According to the invention, it is proposed to carry out checks of dynamic consistency by bringing the equations of the motion of the aircraft into play.

These equations of the motion of the aircraft result from the application of the basic principle of dynamics which is expressed by the following two relationships in the Galilean reference system $R_o$:

$\Sigma F_{ext} = m\Gamma_{Ro}$ (equations of forces)

$\Sigma M_{ext/G} = \frac{d}{dt}[(\pi G)_{Ro}\Omega_{Ra/Ro}]R_a$ (equations of moments)

where
- m: mass of the aircraft
- $\pi G$: mattrix of inertia of the aircraft in relation to its center of gravity G
- $F_{ex}$: external forces exerted on the aircraft
- $M_{ext}/G$: external moments expressed with reference to G, exerted on the aircraft
- $R_o$: Galilean reference system
- $R_a$: aerodynamic reference system deduced from $(R_o)$ by the rotations $(\beta_v)$ $(\sigma_a)$ $(\Phi_v)$
- $\Gamma_{Ro}$: acceleration of the aircraft expressed in $(R_o)$
- $\Omega_{Ra}/R_o$: instantaneous vector of rotation of the reference system $(R_a)$ in relation to the reference system $(R_o)$ The three forces are:
- the weight m.g. $Z_o$,
- the thrust F colinear with the speed vector,
- the aerodynamic force $F_a$ which is in the plane of symmetry of the aircraft.

The moments applied to the aircraft are:
- the moment of the thrust force, considered to be zero for this force is borne by the axis of speed vector and therefore passes through the center of gravity G,
- the moment of the aerodynamic drag $-R.X_a$, which is colinear with the air speed vector,
- the moment of the lift force $-Z.Z_a$, which is perpendicular to the air speed,
- the moment of the weight is zero for it passes through the center of gravity G.

The projection of these two equations along the three axes of the air-path axis system leads to the following six equations (1) to (6):

$$(F - R)/m = V_p + g\sin\sigma_a \tag{1}$$

$$0 = V_p(-\sigma_a\sin\Phi_v + \beta_v\cos\sigma_a\cos\Phi_v) - g\cos\sigma_a\sin\Phi_v \tag{2}$$

$$Z/m = V_p(\sigma_a\cos\Phi_v - \beta_v\cos\sigma_a\sin\Phi_v) + g\cos\sigma_a\cos\Phi_v \tag{3}$$

$$(\sigma_a\cos\Phi_v)[-L(\Phi_v - \beta_v\sin\sigma_a) + N(-\sigma_a\sin\Phi_v + \tag{4}$$

$$\beta_v\cos\sigma_a\cos\Phi_v)] + (\beta_v\cos\sigma_a\sin\Phi_v)[-L(\Phi_v - \beta_v\sin\sigma_a) +$$

$$N(-\sigma_a\sin\Phi_v + \beta_v\cos\sigma_a\cos\Phi_v)] - (-\sigma_a\sin\Phi_v +$$

$$\beta_v\cos\sigma_a\cos\Phi_v)B(\sigma_a\cos\Phi_v + \beta_v\cos\sigma_a\sin\Phi_v) + K(\Phi_v - \beta_v\sin\sigma_a -$$

$$\beta_v\sigma_a\cos\sigma_a) - L(-\sigma_a\sin\Phi_v + \beta_v\cos\sigma_a\cos\Phi_v - \sigma_a\Phi_v\cos\Phi_v) -$$

$$L(-\beta_v\sigma_a\sin\sigma_a\cos\Phi_v - \beta_v\Phi_v\cos\sigma_a\sin\Phi_v) - 2La(\Phi_v - \beta_v\sin\sigma_a) +$$

$$a(N - K)(-\sigma_a\sin\Phi_v + \beta_v\cos\sigma_a\cos\Phi_v) = 0$$

$$(-\sigma_a\sin\Phi_v)[K(\Phi_v - \beta_v\sin\sigma_a) - L(-\sigma_a\sin\Phi_v + \tag{5}$$

$$\beta_v\cos\sigma_a\cos\Phi_v)] + (\beta_v\cos\sigma_a\cos\Phi_v)[K(\Phi_v - \beta_v\sin\sigma_a) -$$

$$L(-\sigma_a\sin\Phi_v + \beta_v\cos\sigma_a\cos\Phi_v)] - (\Phi_v - \beta_v\sin\sigma_a)[-L(\Phi_v -$$

$$\beta_v\sin\sigma_a) + N(-\sigma_a\sin\Phi_v + \beta_v\cos\sigma_a\cos\Phi_v)] +$$

$$B(\sigma_a\cos\Phi_v + \beta_v\cos\sigma_a\sin\Phi_v - \sigma_a\Phi_v\sin\Phi_v) +$$

$$B(-\beta_v\sigma_a\sin\sigma_a\sin\Phi_v + \beta_v\Phi_v\cos\sigma_a\cos\Phi_v) = f(R\sin\alpha + Z\cos\alpha)$$

$$(\Phi_v - \beta\sin\sigma_a)B(\sigma_a\cos\Phi_v + \beta_v\cos\sigma_a\sin\Phi_v) - \tag{6}$$

$$(\sigma_a\cos\Phi_v)[K(\Phi_v - \beta_v\sin\sigma_a) - L(-\sigma_a\sin\Phi_v + \beta_v\cos\sigma_a\cos\Phi_v)] +$$

$$(\beta_v\cos\sigma_a\sin\Phi_v)[K(\Phi_v - \beta_v\sin\sigma_a) - L(-\sigma_a\sin\Phi_v +$$

$$\beta_v\cos\sigma_a\cos\Phi_v)] - L(\Phi_v - \beta_v\sin\sigma_a - \beta_v\sigma_a\cos\sigma_a) +$$

$$N(-\sigma_a\sin\Phi_v + \beta_v\cos\sigma_a\cos\Phi_v - \sigma_a\beta_v\cos\Phi_v) +$$

$$N(-\beta_v\sigma_a\sin\sigma_a\cos\Phi_v - \beta_v\Phi_v\cos\sigma_a\sin\Phi_v) + a(N - K)(\Phi_v -$$

$$\beta_v\sin\sigma_a) - 2La(-\sigma_a\sin\Phi_v + \beta_v\cos\sigma_a\cos\Phi_v) = 0$$

These equations have been obtained by making the following assumptions:
  a) there is no sideslip, which means that the air speed is in the plane of symmetry of the aircraft.
  b) the forces applied to the aircraft are the thrust and the aerodynamic force in assuming that:
    the thrust is borne by the axis of the speed vector,
    the aerodynamic force possesses no component perpendicular to the plane of symmetry of the aircraft and is applied on a localized basis
  c) the mass and the matrix of inertia of the aircraft are constant with respect to changing conditions.

In this system of six equations, there are three unknown factors, namely:
  the algebraic value F of the thrust, for it has been assumed that the thrust is borne by the speed vector,
  the algebraic values R and Z of the two components of the aerodynamic force on the plane of symmetry of the aircraft for it has been assumed that it has no components outside this plane.

It is noted that the equations (2), (4) and (6) include no forces, and that they therefore directly give three equations of consistency.

It will also be noted that the equations (4), (5) and (6) include coefficients A,B,C,E and K,L,N which are the coefficients of the matrices of inertia of the aircraft.

The matrix of inertia of the aircraft expressed in the aircraft reference can be written in the form:

$$\begin{matrix} A & O & E \\ O & B & O \\ -E & O & C \end{matrix}$$

Given the assumptions indicated here above.
In the aerodynamic reference system, it is written as:

$$\begin{matrix} K & O & -L \\ O & B & O \\ L & O & N \end{matrix}$$

where $$K = \frac{A - C}{2} \cos 2\alpha + \frac{A + C}{2} - E \sin 2\alpha$$

$$L = \frac{A - C}{2} \sin 2\alpha + E \cos 2\alpha$$

$$N = \frac{A - C}{2} \cos 2\alpha + \frac{A + C}{2} + E \sin 2\alpha$$

If the matrix of inertia of the aircraft is not known, only the equation of consistency (2) may be verified.

Figure 7:
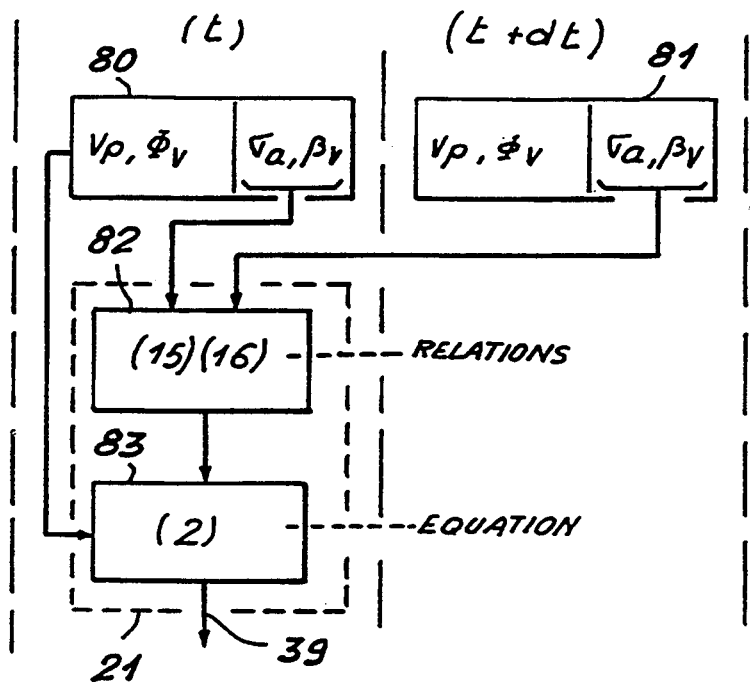
FIG. 7 is a functional diagram of a device that can be used to check a first equation of dynamic consistency.

FIG. 7 is a functional diagram of a device that can be used to verify the equation (2) at the instant t. To this effect, use is made of the values $V_p$, $\Phi_v$, $\sigma_a$, $\beta_v$ at the instants t (rectangle 80) and t+dt (rectangle 81) then the following computation is done: $\sigma_a$ and $\beta_v$ in a circuit 82 by the formulae:

$$\frac{\sigma_a(t + dt) - \sigma_a(t)}{dt} = \dot\sigma_a(t) \quad (15)$$

$$\frac{\beta_v(t + dt) - \beta_v(t)}{dt} = \dot\beta_v(t) \quad (16)$$

and the values of the first derivatives as well as the values of $V_p$, $\Phi_v$, $\sigma_a$, $\beta_v$ at the instant t are entered into the formula (2) (circuit 83) to ascertain that it is equal to zero to a given precision. If the value obtained differs from zero beyond a certain value, the circuit 83 gives an alarm signal on the conductor 39. The circuits 82 and 83 form part of the computer 21 (FIG. 1).

Figure 8:
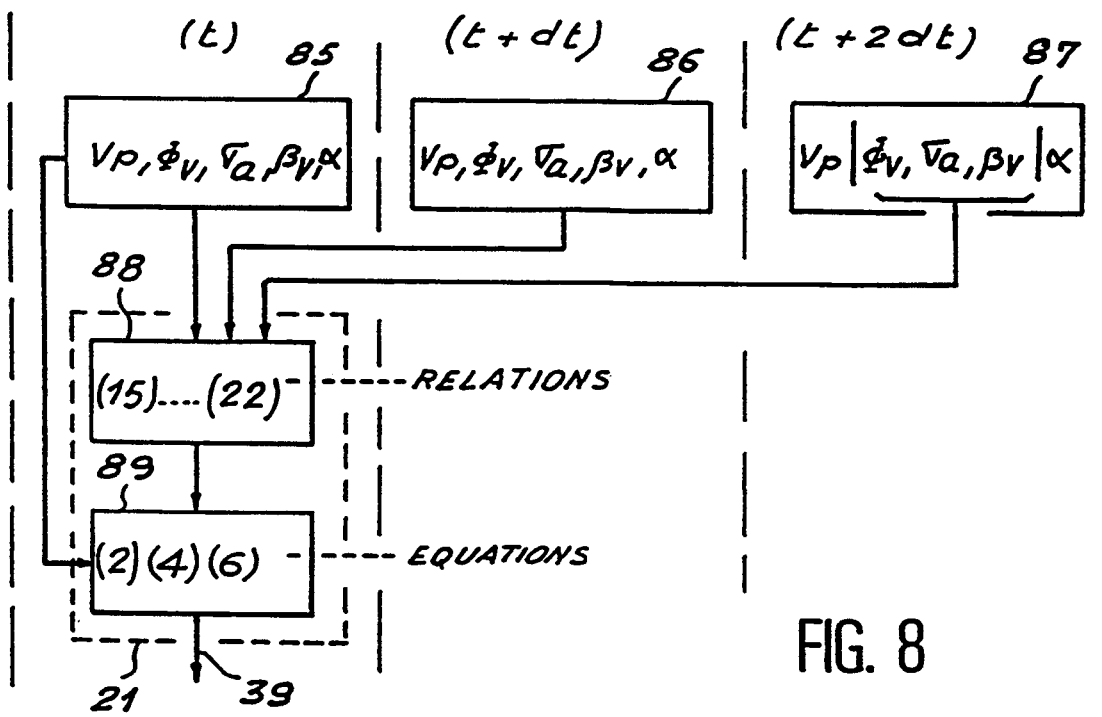
FIG. 8 is a functional diagram of a device that can be used to check two other equations of dynamic consistency.

FIG. 8 shows a functional diagram of a device that enables the checking of the equations (2), (4) and (6) at the instant t. To this effect, the values $V_p$, $\Phi_v$, $\sigma_a$, $\beta_v$, $\alpha$ at the instants t (rectangle 85), (t+dt) (rectangle 86) and (t+2dt) (rectangle 87), are used and then the following computation is done in a circuit 88: the first derivatives $V_p$, $\Phi_v$, $\sigma_a$, $\beta_v$, $\alpha$ and second derivatives $\Phi_v$, $\sigma_a$, $\beta_v$ by the above formulae (15) and (16) for $\sigma_a$ and $\beta_v$ and by the following formula (17) to (22) for the other derivatives.

$$\frac{V_p(t + dt) - V_p(t)}{dt} = \dot V_p(t) \quad (17)$$

$$\frac{\Phi_v(t + dt) - \Phi_v(t)}{dt} = \dot\Phi_v(t) \quad (18)$$

$$\frac{\alpha(t + dt) - \alpha(t)}{dt} = \dot\alpha(t) \quad (19)$$

$$\frac{\Phi_v(t + 2dt) - 2\Phi_v(t + dt) + \Phi_v(t)}{(dt)^2} = \ddot\Phi_v(t) \quad (20)$$

$$\frac{\sigma_a(t + 2dt) - 2\sigma_a(t + dt) + \sigma_a(t)}{(dt)^2} = \ddot\sigma_a(t) \quad (21)$$

$$\frac{\beta_v(t + 2dt) - 2\beta_v(t + dt) + \beta_v(t)}{(dt)^2} = \ddot\beta_v(t) \quad (22)$$

These values of the parameters and of their first and second derivatives are used in a circuit 89 to compute the equations (2), (4) and (6). If the result of the computations is, for each equation, a value that is different from zero beyond a certain threshold, the circuit 89 gives an alarm signal on the conductor 39. The circuits 88 and 89 form part of the computer 21 (FIG. 1).

The equations of consistency (2), (4) and (6), which do not bring the forces applied to the aircraft into play, can be used to ascertain in real time (the instant t) that $V_p$, $\beta_v$, $\sigma_a$, $\beta_v$ and $\alpha$ as well as the first and second derivatives of $\beta_v$, $\sigma_a$ and $\Phi_v$ are consistent, but they cannot be used to check their development in time, i.e. to ascertain that their values at the instants t, (t+dt), (t+2dt) and (t+3dt) vary consistently.

For this checking of the changing situation in time of the aircraft, the invention proposes to use the six equations (1), (2), (3), (4), (5) and (6), defined here above, to compute the parameters: $V_p$, $\Phi_v$, $\sigma_a$, $\beta_v$, $\alpha$, $\Phi_v$, $\sigma_a$ and $\beta_v$ at the instant (t+dt) as a function of the values of the forces F, R and Z and of the parameters $V_p$, $\Phi_v$, $\sigma_a$, $\beta_v$ and $\alpha$ at the instant (t+dt).

These parameters are given by the following formulae:

$$V_p = \frac{F - R}{m} - g\sin\sigma_a \quad (7)$$

$$\Phi_v = A'_o + B'_o\beta_v + C_o\sigma_a \quad (8)$$

in which:

$$A'_o = \frac{-V_p\sigma_a\sin\Phi_v + V_p\beta_v\cos\sigma_a\cos\Phi_v - V_p\beta_v\sigma_a\cos\Phi_v\sin\sigma_a}{V_p\sigma_a\cos\Phi_v + V_p\beta_v\cos\sigma_a\sin\Phi_v + g\cos\sigma_a\sin\Phi_v} +$$

-continued $$B'_o = \frac{V_p \cos\sigma_a \cos\Phi_v}{V_p \sigma_a \cos\Phi_v + V_p \beta_v \cos\sigma_a \sin\Phi_v + g\cos\sigma_a \sin\Phi_v}$$

$$\frac{\sigma_a g \sin\sigma_a \sin\Phi_v}{V_p \sigma_a \cos\Phi_v + V_p \beta_v \cos\sigma_a \sin\Phi_v + g\cos\sigma_a \sin\Phi_v}$$

$$C_o = \frac{-V_p \sin\Phi_v}{V_p \sigma_a \cos\Phi_v + V_p \beta_v \cos\sigma_a \sin\Phi_v + g\cos\sigma_a \sin\Phi_v}$$

$$\sigma_a = \frac{Z}{mV_p}\cos\Phi_v - \frac{g}{V_p}\cos\sigma_a \quad (9)$$

$$\beta_v = \frac{Z\sin\Phi_v}{mV_p\cos\sigma_a} \quad (10)$$

$$\alpha = a_\alpha \beta_v + b_\alpha \sigma_a + c_\alpha \quad (11)$$

in which:

$$a_\alpha = \frac{k_\alpha A}{jnV_p^2}$$

$$b_\alpha = \frac{k_\alpha B}{jnV_p^2}$$

$$c_\alpha = \frac{k_\alpha}{j}\left[\frac{C}{nV_p^2} - \frac{2nV_p}{V_p^3}\right]$$

and $$A = \beta_v g^2 V_p^2 \cos^2\sigma_a$$

$$B = g^2 V_p^2 \sigma_a + g^3 V_p \cos\sigma_a$$

$$C = g^2[-V_p^2 \beta_v^2 \sigma_a \cos\sigma_a + V_p V_p(\beta_v^2 \cos^2\sigma_a + \sigma_a^2)] + g^2[-V_p g\sigma^2 \sin\sigma_a + g\sigma_a V_p \cos\sigma_a - g^2 \sigma_a \cos\sigma_a \sin\sigma_a]$$

with the incidence $\alpha$ which is a function of the load factor n perpendicular to the speed vector and of the aerodynamic speed $V_p$ by the relationship:

$$\alpha = C_{pn} + k_\alpha n/j \, V_p^2$$

where $k_\alpha$ and $C_{pn}$ are aerodynamic coefficients of the aircraft and j is the density of air.

The load factor n given by the equation:

$$n = 1/g[(V_p\beta_v\cos\sigma_a)^2 + (V_p\sigma_a + g\cos\sigma_a)^2]^{\frac{1}{2}}$$

By successive substitutions and derivations, the following relationships are established on the basis of the equations (1) to (6):

$$A_8 + B_8 \beta_v + C_8 \sigma_a + D_8 \beta_v \sigma_a + E_8 \beta_v^2 + F_8 \sigma_a^2 = 0 \quad (13)$$

$$A_9 + B_9 \beta_v + C_9 \sigma_a + D_9 \beta_v \sigma_a + E_9 \beta_v^2 + F_9 \sigma_a^2 = 0 \quad (14)$$

This system is formed by two polynomials in $\sigma_a$ and $\beta_v$ the coefficients $A_8$ to $F_8$ and $A_9$ to $F_9$ of which are explicit coefficients of $V_p$, $\Phi_v$, $\sigma_a$, $\beta_v$ and $\sigma_a$ and $\beta_v$ being themselves a function of $V_p$, $\Phi_v$, $\sigma_a$, $\beta_v$ and $\alpha$. These coefficients are given by the following relationships:

$$A_8 = F_o + A_o A'_o$$

$$B_8 = A_o B'_o + A'_o B_o + D_o$$

$$C_8 = A_o C_o + A'_o C_o + E_o$$

$$D_8 = B_o C_o + B'_o C_o$$

-continued $$E_8 = B_o B'_o$$

$$F_8 = C_o C_o$$

$$A_9 = A_5 {A'_o}^2 + B_5 A'_o + E_5$$

$$B_9 = C_5 + B_5 B'_o + 2A_5 A'_o B'_o$$

$$C_9 = D_5 + B_5 C'_o + 2A_5 A'_o C'_o$$

$$D_9 = 2A_5 B'_o C'_o$$

$$E_9 = 2A_5 {B'_o}^2$$

$$F_9 = 2A_5 C_o$$

the coefficients $A'_o$, $B'_o$ and $C'_o$ having been defined earlier in relation to the formula (8).

$$A_o = LA_4 - KA_6$$

$$B_o = LB_4 - KB_6$$

$$C_o = LC_4 - KC_6$$

$$D_o = LD_4 - KD_6$$

$$E_o = LE_4 - KE_6$$

$$F_o = LF_4 - KF_6$$

$$A_4 = 2Lc_\alpha - L\sigma_a\cos\Phi_v$$

$$B_4 = 2La_\alpha$$

$$C_4 = 2Lb_\alpha$$

$$D_4 = -K\sin\sigma_a + L\cos\sigma_a\cos\Phi_v + a_\alpha[-2L\beta_v\sin\sigma_a + (N - K)(-\sigma_a\sin\Phi_v + \beta_v\sigma_a\cos\Phi_v)]$$

$$E_4 = -L\sin\Phi_v + b_\alpha[-2L\beta_v\sin\sigma_a + (N - K)(-\sigma_a\sin\Phi_v + \beta_v\cos\sigma_a\cos\Phi_v)]$$

$$F_4 = (\sigma_a\cos\Phi_v) + [L\beta_v\sin\sigma_a + N(-\sigma_a\sin\Phi_v + \beta_v\cos\sigma_a\cos\Phi_v)] + (\beta_v\cos\sigma_a\sin\Phi_v)[L\beta_v\sin\sigma_a + N(-\sigma_a\sin\Phi_v + \beta_v\cos\sigma_a\cos\Phi_v)] - (-\sigma_a\sin\Phi_v + \beta_v\cos\sigma_a\cos\Phi_v)B(\sigma_a\cos\Phi_v + \beta_v\cos\sigma_a\sin\Phi_v) - K\beta_v\sigma_a\cos\sigma_a - L(\sigma_a\Phi_v\cos\Phi_v + \beta_v\sigma_a\sin\sigma_a\cos\Phi_v) + c_\alpha[-2L\beta_v\sin\sigma_a + (N - K)(-\sigma_a\sin\Phi_v + \beta_v\cos\sigma_a\cos\Phi_v)]$$

$$A_5 = -L$$

$$B_5 = K(-\sigma_a\sin\Phi_v + \beta_v\cos\sigma_a\cos\Phi_v) + N(-\sigma_a\sin\Phi_v + \beta_v\cos\sigma_a\cos\Phi_v) - 2L\beta_v\sin\sigma_a - B(\sigma_a\sin\Phi_v - \beta_v\cos\sigma_a\cos\Phi_v)$$

$$C_5 = B\cos\sigma_a\sin\Phi_v$$

$$D_5 = B\cos\Phi_v$$

$$E_5 = (-\sigma_a\sin\Phi_v)[-K\beta_v\sin\sigma_a - L(-\sigma_a\sin\Phi_v + \beta_v\cos\sigma_a\cos\Phi_v)] + (\beta_v\cos\sigma_a\cos\Phi_v)[K\beta_v\sin\sigma_a - L(-\sigma_a\sin\Phi_v + \beta_v\cos\sigma_a\cos\Phi_v)] - \beta_v\sin\sigma_a[L\beta_v\sin\sigma_a + N(-\sigma_a\sin\Phi_v + \beta_v\cos\sigma_a\cos\Phi_v] - B(\beta_v\sigma_a\sin\sigma_a\sin\Phi_v) - f(R\sin\alpha + Z\cos\alpha)$$

$$A_6 = (B - N - K)(\sigma_a\cos\Phi_v + \beta_v\cos\sigma_a\sin\Phi_v) + (N - K)c_\alpha$$

$$B_6 = (N - K)a_\alpha$$

$$C_6 = (N - K)b_\alpha$$

-continued $$D_6 = L\sin\sigma_a + N\cos\sigma_a\cos\Phi_v + a_\alpha[-(N-K)(\beta_v\sin\sigma_a - 2L(-\sigma_a\sin\Phi_v + \beta_v\cos\sigma_a\cos\Phi_v)]$$

$$E_6 = -N\sin\Phi_v + b_\alpha[-(N-K)\beta_v\sin\sigma_a - 2L(-\sigma_a\sin\Phi_v + \beta_v\cos\sigma_a\cos\Phi_v)]$$

$$F_6 = -B\beta_v\sin\sigma_a(\sigma_a\cos\Phi_v + \beta_v\cos\sigma_a\sin\Phi_v) + (\sigma_a\cos\Phi_v)[K\beta_v\sin\sigma_a + L(-\sigma_a\sin\Phi_v + \beta_v\cos\sigma_a\cos\Phi_v)] + \beta_v\cos\sigma_a\sin\Phi_v)[K\beta_v\sin\sigma_a + L(-\sigma_a\sin\Phi_v + \beta_v\cos\sigma_a\cos\Phi_v)] + L\beta_v\sigma_a\cos\sigma_a - N(\sigma_a\beta_v\sin\sigma_a\cos\Phi_v) + c_\alpha[-(N-K)\beta_v\sin\sigma_a - 2L(-\sigma_a\sin\Phi_v + \beta_v\cos\sigma_a\cos\Phi_v)]$$

The system of equations (13) and (14) may be resolved by various digital methods, in particular by Newton's method.

After several computation loops, we obtain $\beta_v$ and $\sigma_a$ to the desired precision: this enables the computation of $\Phi_v$ by equation (8), of $\alpha$ by equation (11), of $\Phi_v$ by equation (12).

$$\Phi_v = -\frac{1}{K}[(D_4\beta_v + E_4\sigma_a + F_4 + \Phi_v(A_4 + B_4\beta_v + C_4\sigma_a)] \quad (12)$$

where $A_4$, $B_4$, $C_4$, $D_4$, $E_4$ and $F_4$ are explicit coefficients (defined here above) of $V_p$, $\Phi_v$, $\sigma_a$, $\beta_v$ and their first derivatives, this equation being derived from the equation (4) after elimination of $\alpha$.

The values of the parameters: $V_p$, $\Phi_v$, $\sigma_a$, $\alpha$, $\Phi_v$, $\sigma_a$, $\beta_v$ which have been computed by means of the formulae and equations described here above in using the values of the parameters obtained by the sensors at the instant (t+dt) and of the forces computed at the instant t by the equations (1), (3) and (5) are compared with the values of the corresponding parameters which are determined from the navigation parameters at the instants t, (t+dt) and (t+2dt) in implementing the relationships (15) to (22).

By analogy, the first and second derivatives at the instant (t+dt) are computed by means of the values at the instants (t+dt), (t+2dt) and (t+3dt).

Figure 9:
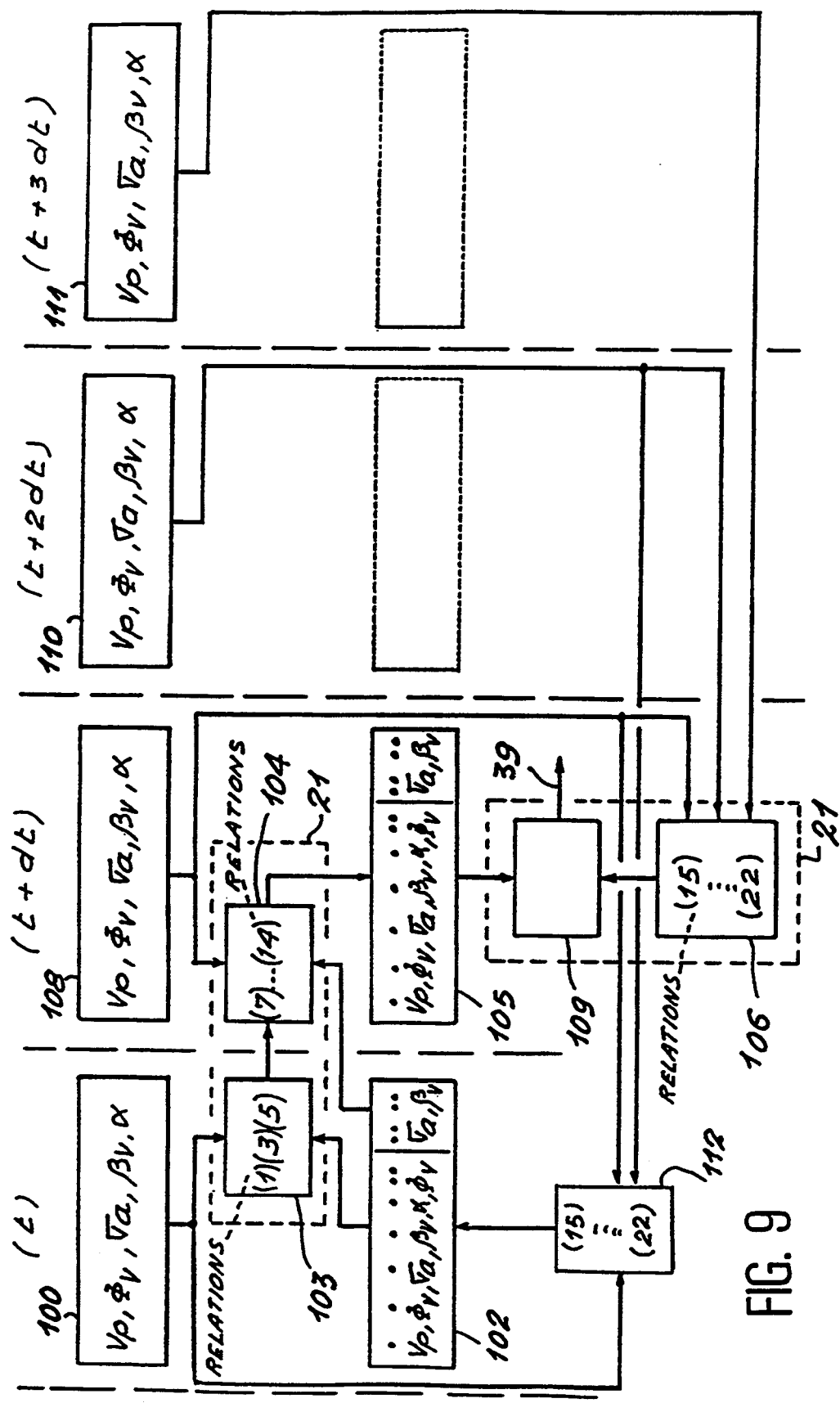
FIG. 9 is a functional diagram of a device that can be used to check the consistency of the navigation parameters and of their first and second derivatives.

FIG. 9 gives a very schematic summary view of this aspect of the invention which relates to dynamic checks of consistency of the changing situation of the aircraft. At the instant t, the sensors give the parameters $V_p$, $\Phi_v$, $g_a$, $\beta_v$ and $\alpha$ (rectangle 100) which are combined according to the equations (1), (3) and (5) (rectangle 103) with the values of the first and second derivatives $V_p$, $\Phi_v$, $\sigma_a$, $\beta_v$, $\alpha$, $\Phi_v$, $\sigma_a$, $\beta_v$ (rectangle 102) computed at the instant t by means of the equations (15) to (22) (rectangle 112) of the changes undergone by the aircraft to compute the forces F, R and Z that are applied to the aircraft at the instant t.

If it is assumed that the computed forces F, R and Z at the instant t vary little during the time interval dt, they can be used in a computer 104 to obtain the first derivatives $V_p$, $\Phi_v$, $\sigma_a$, $\beta_v$, $\alpha$ and second (t+dt) in using the above-defined equations (7) to (14). To this effect, the computer 104 must also be given the value of the parameters $V_p$, $\Phi_v$, $\sigma_a$, $\beta_v$ and $\alpha$ at the instant (t+dt) as well as the initial values of $\sigma_a$ and $\beta_v$ at the instant t (rectangle 102) to make a computation, by successive approximations, of the values of $\sigma_a$ and $\beta_v$, at the instant (t+dt).

The values of the parameters and of their derivatives, which are computed by the computer 104, are compared in a comparator 109 with their corresponding values which are computed by a computer 106 on the basis of the values of the parameters $V_p$, $\Phi_v$, $\sigma_a$, $\beta_v$ and $\alpha$ at the instants (t+dt) (rectangle 108), (t+2dt) (rectangle 110) and (t+3dt) (rectangle 111).

When the comparison of the different values of the parameters and of their derivatives obtained, firstly, directly from the navigation parameters at the instants (t+dt)(t+2dt) and (t+3dt) and, secondly, by computations using the equations of the motion, reveals differences that exceed a certain value, the comparator 109 gives an alarm signal.

Naturally, the thresholds from which an alarm signal is given vary according to the parameter considered and according to the degree to which it is sought to ensure reliability of information.

The values of the parameters $V_p$, $\Phi_v$, $\sigma_a$, $\beta_v$, $\alpha$, $\Phi_v$, $\sigma_a$, $\beta_v$, at the instant (t+dt) (rectangle 105), are kept in memory to be used in the computation of the forces F, R and Z at the following instant (t+dt) in combination with the values of the parameters $V_p$, $\Phi_v$, $\sigma_a$, $\beta_v$ and $\alpha$ at the instant (t+dt) (rectangle 108). These forces shall be likened to the forces at the instant (t+2dt) for the checking of the parameters at the instant (t+2dt).

In one variant, for the computation of the forces F, R and Z, it is possible to use the values of the parameters $V_p$, $\Phi_v$, $\sigma_a$, $\beta_v$ and $\alpha$ and of their first and second derivatives which have been computed at the instant t by means of the relationships (7) to (14).

In another variant, it is possible to use either the values computed by means of the relationships (15) to (22), which are more precise, or those computed by means of the relationships (7) to (14) as a function of the result of the comparison made by the circuit 109 so as not to use the parameter computed by means of the relationships (7) to (14) which is inconsistent.

The operations described here above are repeated at each instant separated from the preceding one by the time interval dt.

What is claimed is:

1. Method for ensuring the reliability of the data used to pilot an aircraft, comprising the steps of:
   (a) obtaining data corresponding, firstly, to parameters given by sensors and, secondly, to parameters indicative of navigation that are given by a computing device and presented to the pilot, either by means of onboard instruments or by means of a symbol generator associated with a display device giving a display in the form of synthesis images that include one or more reticles as well as alphanumerical characters;
   (b) detecting and recognizing said synthesis images so as to obtain digital signals indicative thereof;
   (c) computing one or more navigation parameters and/or sensor parameters from said digital signals;
   (d) comparing said computed parameters with values from the group consisting of the same parameters given by said computation device or with values from the sensors so as to detect inconsistencies between the compared parameters;
   (e) generating an alarm signal when one or more of said inconsistencies go beyond a determined threshold; wherein said step (b) of detecting and recognizing includes the steps of:
      recording one image of the screen of the display device;

analyzing said recorded image so as to identify reticles and alphanumerical characters, and determining the digital values of data presented to the pilot.

2. A method as in claim 1 for ensuring the reliability of the data used to pilot an aircraft, said data corresponding, firstly, to parameters given by sensors and, secondly, to parameters indicative of navigation that are given by a computing device and onboard instruments, wherein said comparing step includes the steps of:

(a) computing, from navigation parameters $\sigma_a$ indicative of horizon, and $\beta_v$, which is an angle between two axes, at the instants t and (t+dt), the first derivatives $\sigma_a$, $\beta_v$, being at the instant t, and (b) checking the relationship (2) by using the values of the parameters $V_p$ indicating aerodynamic speed, $\Phi_v$, $\sigma_a$ and $\beta_v$ indicating position angle values at an instant t and of the first derivatives of $\sigma_a$ and $\beta_v$, at the instant t computed by the operation (a), and wherein said generating an alarm step comprises the step of generating an alarm signal when said relationship (2) is not verified to a given precision.

3. A method as in claim 2 for ensuring the reliability of the data used to pilot an aircraft, said information elements corresponding, firstly, to parameters given by sensors and, secondly, to parameters indicative of navigation parameters that are given by a computing device and onboard instruments, wherein said method includes the further steps of:

(d) computing from the navigation parameters of $\sigma_a$, $\beta_v$, $\Phi_v$ and $\alpha$ at the instants t, (t+dt) and (t+2dt), the first derivatives $\sigma_a$, $\beta_v$, $\Phi_v$ and $\alpha$ and of the second derivatives $\sigma_a$, $\beta_v$, and $\Phi_v$ at the instant t, (e) checking of the relationships (4) and (6) in using the values of $V_p$, $\sigma_a$, $\beta_v$, $\Phi_v$, $\alpha$ and the first derivatives of $\sigma_a$, $\beta_v$, $\Phi_v$ and $\alpha$ and second derivatives $\sigma_a$, and $\beta_v$, and $\Phi_v$ at the instant (t) computed by the operation (d), and (f) generating an alarm signal when one of said relationships (4) and (6) is not verified to a given precision.

4. A method as in claim 3 wherein said method includes the further steps of:

(g) computing, by means of the relationships (1), (3) and (5) the forces F, R and Z applied to the aircraft at the instant t by using the values of the parameters $V_p$, $\Phi_v$, $\sigma_a$, $\beta_v$, $\alpha$ at the instant t, the values of the first derivatives $V_p$, $\Phi_v$, $\sigma_a$, $\beta_v$ and $\alpha$ at the instants t and (t+dt) and the values of the secondary derivatives $\sigma_a$ and $\beta_v$ at the instant t computed from $\sigma_a$ and $\beta_v$ at the instants t (t+dt) and (t+2dt)

(h) computing, from the navigation parameters $V_p$, $\Phi_v$, $\sigma_a$, $\beta_v$, and $\alpha$ at the instant (t+dt) and from the values of the applied forces obtained by the operation (g), of the parameters $V_p$, $\Phi_v$, $\sigma_a$, $\beta_v$, $\alpha$, $\Phi_v$, $\sigma_a$, $\beta_v$ at the instant (t+dt)

(i) the computation of the parameters $V_p$, $\Phi_v$, $\sigma_a$, $\beta_v$, $\Phi_v$, $\alpha$, $\sigma_a$ and $\beta_v$ at the instant (t+dt) in using the values of the parameters $V_p$, $\Phi_v$, $\sigma_a$, $\beta_v$, and $\alpha$ at the instants (t+dt), (t+2dt) and (t+3dt)

(j) computing the values of the parameters computed by the operation (h) with those computed by the operation (i);

(k) generating an alarm signal when the result of the comparison indicates that one of the values compared is different beyond a certain threshold.

5. A method according to claim 4 wherein, in the step (g) consisting in computing the forces applied to the aircraft F, R and Z at the instant t is done by using the values of the parameters $V_p$, $\Phi_v$, $\sigma_a$, $\beta_v$, and $\alpha$ at the instant t and the values of the first derivatives $V_p$, $\Phi_v$, $\sigma_a$, $\beta_v$, $\alpha$ and of the second derivatives $\sigma_a$, $\beta_v$ which have been computed at the instant t 6. A method according to claim 5, further comprising the following additional step of:

(l) selecting the value of the parameter to be chosen for computing the forces F, R and Z, either the value coming from the computation by the relationships (15) to (22) or that coming from the computation depending on the value of the alarm signal given by the operation (k).

7. A method according to claim 4 wherein, in the step (h), consisting in computing the values of $\sigma_a$ and $\beta_v$, at the instant (t+dt), is done by resolving equations by successive approximation, the initial values of which are those of $\sigma_a$ and $\beta_v$, at the instant t.

8. A method according to claim 1, wherein the steps are carried out at each instant separated from a previous instant by a time interval dt.

9. System for ensuring the reliability of the data used to pilot an aircraft, said data corresponding, firstly, to parameters given by the sensors and, secondly, to parameters indicative of navigation that are given by a computing device and presented to the pilot, either by means of onboard instruments or by means of a symbol generator associated with a display device giving a display in the form of synthesis images that include one or more reticles as well as alphanumerical characters, comprising:

means for providing digital signals that represent piloting data that are presented to the pilot on the display device;

a first computer to compute one or more navigation parameters from said digital signals;

a first comparator to compare values of the navigation parameters given by the first computer with values of same parameters given by the computing device or by the instruments, and to generate an alarm signal when the result of the comparison indicates that the compared values are different beyond a certain threshold;

a second computer to compute one or more sensor parameters from the values of the navigation parameters given either by the computation device or by the first parameter, and a second comparator to compare the values of the sensor parameters given by the second computer with those given by the corresponding sensors or the onboard instruments and to generate an alarm signal when the result of the comparison indicates that the compared values are different beyond a certain threshold.

10. System according to claim 9, wherein means for providing digital signals that represent piloting data comprises:

a camera device for obtaining one electronic image of the screen of said display device;

a coding device for coding said electronic image into digital codes;

a memory for recording said digital codes provided by said coding devices; and a device for processing the digital codes so as to identify the reticules and the alphanumerical characters contained in said electronic image.

11. System according to claims 9 or 10 wherein said first and second computers as well as said first and second comparators constitute only one computer.

12. A method for ensuring reliability of data used to pilot an aircraft, said method comprising the steps of:
obtaining information from sensors indicative of characteristics of the aircraft;
providing a computational device, connected to outputs of the sensors, to compute a computational result based on said sensor outputs;
displaying information indicative of said computational result to the pilot;
providing a reverse computational device, in a path between said computational device and a display, and which receives an output of said computational device and performs a reverse computation on said output to provide a result which should be the same as the input to the computational device;
comparing the result of said reverse computation with the value input;
forming an alarm indication when the results of said comparing step vary by more that a predetermined amount.

13. A method as in claim 12 wherein said alarm indication includes displaying information on a screen indicative of the error.

14. A method as in claim 12 wherein said computational device performs a function F, and said reverse computational device performs a function $F^{-1}$ which is an inverse of the function F.

15. A method as in claim 12 wherein said computational device includes a calculating device and a symbol generator, and said reverse computational device includes two separate devices, a first of which performs a reverse computation on an output of said calculating device, and a second of which performs a reverse calculation on an output of said symbol generator, and two comparators, each of which compare a computation input with a result of the reverse computation.

16. A method as in claim 12 wherein said reverse computational device calculates whether a reticle on the display, on which the information is to be displayed, is correct.

17. An apparatus for checking data used to pilot an aircraft, comprising:
a plurality of sensors for producing information indicative of characteristics of the aircraft;
a computational device, connected to receive information from the sensors, to provide a computational result based on outputs of said sensor;
a display device, which displays said computational result to the pilot;
a reverse computational device, coupled in a path between said computational device and said display device, and which receives an output of said computational device and performs a reverse computation on said output, which reverse computation is an inverse of a computation of carried out by said computational device, to provide a result which should be the same as the sensor outputs that are input to the computational device;
a comparator which receives and compares a result of said reverse computation with an input thereto; and
an alarm indication device, which indicates when the results vary by more than a predetermined amount.

18. An apparatus as in claim 17 wherein said alarm indication device includes means for displaying information on a screen indicative of the error.

19. An apparatus as in claim 17 wherein said computational device performs a function F, and said reverse computational device performs a function $F^{-1}$ which is an inverse of the function F.

20. An apparatus as in claim 17 wherein said computational device includes a calculating device and a symbol generator, and said reverse computational device includes first and second reverse calculation units, which perform a reverse computation on an output of said calculating device and said symbol generator, respectively, and two comparators for respectively comparing a result of the reverse computation with an input to the computational device.

21. An apparatus as in claim 17 wherein said computational device calculates a reticle on the display on which the information is to be displayed.

22. An apparatus as in claim 20 wherein said first and second reverse calculation units calculate based on first and second derivatives, respectively.

23. An apparatus as in claim 20 wherein said calculations include calculation of static parameters and of dynamic parameters, respectively.

24. A method as in claim 17 wherein said calculations include calculation of static parameters and of dynamic parameters, respectively.

* * * * *

UNITED STATES PATENT AND TRADEMARK OFFICE
CERTIFICATE OF CORRECTION

PATENT NO. : 5,335,177                  Page 1 of 26

DATED : August 2, 1994

INVENTOR(S) : BOITEAU, Catherine
PARIUS, Roger

It is certified that error appears in the above-identified patent and that said Letters Patent is hereby corrected as shown below: Pages 1-26

IN THE ABSTRACT:

In the abstract: line 4 delete
"$V_p$, $\Phi_v$, $\sigma_a$, $\beta_v$, $\alpha$, $\Phi_v$, $\sigma_a$, $\beta_v$" and insert --$\dot{V}_p$, $\dot{\Phi}_v$, $\dot{\sigma}_a$, $\dot{\beta}_v$, $\dot{\alpha}$, $\ddot{\Phi}_v$, $\ddot{\sigma}_a$, $\ddot{\beta}_v$--.

IN THE SPECIFICATION:

Delete column 3, line 20 to column 4, line 9, and insert the following:

— (a) computing, from the navigation parameters $\sigma_a$, $\beta_v$, the instants t and (t+dt), the first derivatives $\dot{\sigma}_a$, $\dot{\beta}_v$, at the instant t, (b) checking the relationship (2) defined hereinafter by using the values of the parameters $V_p$, $\Phi_v$, $\sigma_a$ and $\beta_v$ at the instant t and of the first derivatives $\sigma_a$ and $\beta_v$ at the instant t computed by the operation (a), and (c) generating an alarm signal when said relationship (2) is not verified to a given precision.

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

(SPECIFICATION CONT'D)

The above-described method may be complemented by the following steps of :

(d) computing from the navigation parameters $\sigma_a$, $\beta_V$, $\Phi_V$ and $\alpha$ at the instants t, (t+dt) and (t+2dt), the first derivatives $\dot{\sigma}_a$, $\dot{\beta}_V$, $\dot{\Phi}_V$ and $\dot{\alpha}$ and the second derivatives $\ddot{\sigma}_a$, $\ddot{\beta}_V$ and $\ddot{\Phi}_V$ at the instant t, (e) checking the relationships (4) and (6) defined hereinafter by using the values of $V_p$, $\sigma_a$, $\beta_V$, $\Phi_V$, $\alpha$ and of the first derivatives $\dot{\sigma}_a$, $\dot{\beta}_V$, $\dot{\Phi}_V$, $\dot{\alpha}$ and second derivatives $\ddot{\sigma}_a$ and $\ddot{\beta}_V$ and $\ddot{\Phi}_V$ at the instant (t) computed by the operation (d), and (f) generating an alarm signal when one of said relationships (4) and (6) is not checked to a given precision.

It may also include the following steps of :

(g) computing, by means of the relationships (1), (3) and (5) the forces F, R and Z applied to the aircraft at the instant t by using the values of the

UNITED STATES PATENT AND TRADEMARK OFFICE
CERTIFICATE OF CORRECTION

PATENT NO. : 5,335,177
DATED : August 2, 1994
INVENTOR(S) : BOITEAU, Catherine
PARIUS, Roger It is certified that error appears in the above-identified patent and that said Letters Patent is hereby corrected as shown below:

(SPECIFICATION CONT'D)

parameters $V_p$, $\Phi_v$, $\sigma_a$, $\beta_v$, $\alpha$ at the instant t, the values of the first derivatives $\dot{V}_p$, $\dot{\Phi}_v$, $\dot{\sigma}_a$, $\dot{\beta}_v$, $\dot{\alpha}$ at the instant t computed from $V_p$, $\Phi_v$, $\sigma_a$, $\beta_v$ and $\alpha$ at the instants t and (t+dt) and the values of the secondary derivatives $\ddot{\sigma}_a$ and $\ddot{\beta}_v$ at the instant t computed from $\sigma_a$ and $\beta_v$ at the instants t, (t+dt) and (t+2dt) by using the relationships (15) to (22) defined hereinafter;

(h) computing, from the navigation parameters $V_p$, $\Phi_v$, $\sigma_a$, $\beta_v$, and $\alpha$ at the instant (t+dt) and from the values of the applied forces obtained by the operation (g), of the parameters $\dot{V}_p$, $\dot{\Phi}_v$, $\dot{\sigma}_a$, $\dot{\beta}_v$, $\dot{\alpha}$, $\ddot{\Phi}_v$, $\ddot{\sigma}_a$, $\ddot{\beta}_v$ at the instant (t+dt) in using the relationships (7) to (14) defined hereinafter, (i) computing the parameters $\dot{V}_p$, $\dot{\Phi}_v$, $\dot{\sigma}_a$, $\dot{\beta}_v$, $\ddot{\Phi}_v$, $\ddot{\alpha}$ $\ddot{\sigma}_a$ and $\ddot{\beta}_v$ at the instant (t+dt) in using the values of the parameters $V_p$, $\Phi_v$, $\sigma_a$, $\beta_v$, and $\alpha$ at the instants (t+dt), (t+2dt) and (t+3dt)

(j) comparing the values of the parameters computed by the operation (h) with those computed by the operation (i);

UNITED STATES PATENT AND TRADEMARK OFFICE
CERTIFICATE OF CORRECTION

PATENT NO.   :   5,335,177
DATED        :   August 2, 1994
INVENTOR(S)  :   BOITEAU, Catherine
                 PARIUS, Roger It is certified that error appears in the above-identified patent and that said Letters Patent is hereby corrected as shown below:

(SPECIFICATION CONT'D)

(k) generating an alarm signal when the result of the
    comparison indicates that one of the values compared
    is different beyond a certain threshold.
    One variant makes use, in the operation (g), of the
values of the parameters $V_p$, $\Phi_v$, $\sigma_a$, $\beta_v$, and $\alpha$ at the
instant t and the values of the first derivatives
$\dot{V}_p$, $\dot{\Phi}_v$, $\dot{\sigma}_a$, $\dot{\beta}_v$, $\dot{\alpha}$
and of the second derivatives $\ddot{\sigma}_a$, $\ddot{\beta}_v$ which have been
computed by the operation (h) for the instant t. --

UNITED STATES PATENT AND TRADEMARK OFFICE
CERTIFICATE OF CORRECTION

PATENT NO.   :   5,335,177

DATED        :   August 2, 1994

INVENTOR(S)  :   BOITEAU, Catherine
                 PARIUS, Roger

It is certified that error appears in the above-identified patent and that said Letters Patent is hereby corrected as shown below:

Column 4, line 63, after "pack" insert --12--.

Column 5, line 67, change "display -screens" to --display screens--.

Column 7, line 11, delete "fulfil" and insert --fulfill--;
         line 13, delete "that are"; and
         line 49, after "have" insert --to--.

Column 10, line 5, delete "commutation" and insert --computation--.

UNITED STATES PATENT AND TRADEMARK OFFICE
CERTIFICATE OF CORRECTION

PATENT NO.    : 5,335,177

DATED         : August 2, 1994

INVENTOR(S)   : BOITEAU, Catherine
                PARIUS, Roger

It is certified that error appears in the above-identified patent and that said Letters Patent is hereby corrected as shown below:

Column 11, line 33, change " $\|V_{ground}\|$ " to -- $\|\vec{V}_{ground}\|$ -- .

Column 13, line 49, change "go" to -- $g_o$ -- .

Column 14, line 10, after "i.e." insert a comma.

Column 15, line 33, change "$T_S\ V_{wind}$" to -- $T_S \cdot V_{wind}$ -- .

Column 17, line 45 change "given" to --(given--;
        line 57, after "and" insert -- $Z_v =$ --;
        line 60, change "$\alpha$" to -- $\beta$ -- .

Column 18, line 60, change "go" to -- $g_o$ -- .

Column 19, line 31, change "$\alpha$" to -- $\beta$ -- .

Column 20, line 1, change "$\delta_1$" to -- $\epsilon_1$ --; and
        line 2, change "$\delta_g$" to -- $\epsilon_g$ -- .

Column 21, line 49, change "$F_1^{-1}$" (second occurrence) to -- $F_2^{-1}$ --; and
        line 67, change "mattrix" to --matrix-- .

UNITED STATES PATENT AND TRADEMARK OFFICE
CERTIFICATE OF CORRECTION

PATENT NO. : 5,335,177
DATED : August 2, 1994
INVENTOR(S) : BOITEAU, Catherine
PARIUS, Roger It is certified that error appears in the above-identified patent and that said Letters Patent is hereby corrected as shown below:

Column 22, line 1, change "$F_{ex}$:" to --$F_{ext}$:--;

Delete Column 22, lines 31 to 66 and insert the following:

$$(F-R)/m = \dot{V}_p + g \sin\sigma_a \quad (1)$$

$$0 = V_p(-\dot{\sigma}_a \sin\Phi_v + \dot{\beta}_v \cos\sigma_a \cos\Phi_v) - g \cos\sigma_a \sin\Phi_v \quad (2)$$

$$Z/m = V_p(\dot{\sigma}_a \cos\Phi_v - \dot{\beta}_v \cos\sigma_a \sin\Phi_v) + g \cos\sigma_a \cos\Phi_v \quad (3)$$

$$(\dot{\sigma}_a\cos\Phi_v)\left[-L(\dot{\Phi}_v-\dot{\beta}_v\sin\sigma_a)+N(-\dot{\sigma}_a\sin\Phi_v+\dot{\beta}_v\cos\sigma_a\cos\Phi_v)\right]$$

$$+(\dot{\beta}_v\cos\sigma_a\sin\Phi_v)\left[-L(\dot{\Phi}_v-\dot{\beta}_v\sin\sigma_a)+N(-\dot{\sigma}_a\sin\Phi_v+\dot{\beta}_v\cos\sigma_a\cos\Phi_v)\right]$$

$$-(-\dot{\sigma}_a\sin\Phi_v+\dot{\beta}_v\cos\sigma_a\cos\Phi_v)B(\dot{\sigma}_a\cos\Phi_v+\dot{\beta}_v\cos\sigma_a\sin\Phi_v)$$

$$+K(\ddot{\Phi}_v-\ddot{\beta}_v\sin\sigma_a-\dot{\beta}_v\dot{\sigma}_a\cos\sigma_a)$$

$$-L(-\ddot{\sigma}_a\sin\Phi_v+\dot{\beta}_v\cos\sigma_a\cos\Phi_v-\dot{\sigma}_a\dot{\Phi}_v\cos\Phi_v)$$

$$-L(-\dot{\beta}_v\dot{\sigma}_a\sin\sigma_a\cos\Phi_v-\dot{\beta}_v\dot{\Phi}_v\cos\sigma_a\sin\Phi_v)$$

$$-2L\dot{\alpha}(\dot{\Phi}_v-\dot{\beta}_v\sin\sigma_a)+\dot{\alpha}(N-K)(-\dot{\sigma}_a\sin\Phi_v+\dot{\beta}_v\cos\sigma_a\cos\Phi_v) = 0 \quad (4)$$

UNITED STATES PATENT AND TRADEMARK OFFICE
CERTIFICATE OF CORRECTION

PATENT NO.   : 5,335,177
DATED        : August 2, 1994
INVENTOR(S)  : BOITEAU, Catherine
               PARIUS, Roger It is certified that error appears in the above-identified patent and that said Letters Patent is hereby corrected as shown below:

Delete Column 22, lines 31 to 66 and insert the following cont'd:

$$(-\dot{\sigma}_a \sin\Phi_v) \left[ K(\dot{\Phi}_v - \dot{\beta}_v \sin\sigma_a) - L(-\dot{\sigma}_a \sin\Phi_v + \dot{\beta}_v \cos\sigma_a \cos\Phi_v) \right]$$

$$+(\dot{\beta}_v \cos\sigma_a \cos\Phi_v) \left[ K(\dot{\Phi}_v - \dot{\beta}_v \sin\sigma_a) - L(-\dot{\sigma}_a \sin\Phi_v + \dot{\beta}_v \cos\sigma_a \cos\Phi_v) \right]$$

$$-(\dot{\Phi}_v - \dot{\beta}_v \sin\sigma_a) \left[ -L(\dot{\Phi}_v - \dot{\beta}_v \sin\sigma_a) + N(-\dot{\sigma}_a \sin\Phi_v + \dot{\beta}_v \cos\sigma_a \cos\Phi_v) \right]$$

$$+B(\ddot{\sigma}_a \cos\Phi_v + \ddot{\beta}_v \cos\sigma_a \sin\Phi_v - \dot{\sigma}_a \dot{\Phi}_v \sin\Phi_v)$$

$$+B(-\dot{\beta}_v \dot{\sigma}_a \sin\sigma_a \sin\Phi_v + \dot{\beta}_v \dot{\Phi}_v \cos\sigma_a \cos\Phi_v)$$

$$= f(R\sin\alpha + Z\cos\alpha) \qquad (5)$$

$$(\dot{\Phi}_v - \dot{\beta}\sin\sigma_a) B(\dot{\sigma}_a \cos\Phi_v + \dot{\beta}_v \cos\sigma_a \sin\Phi_v)$$

$$-(\dot{\sigma}_a \cos\Phi_v) \left[ K(\dot{\Phi}_v - \dot{\beta}_v \sin\sigma_a) - L(-\dot{\sigma}_a \sin\Phi_v + \dot{\beta}_v \cos\sigma_a \cos\Phi_v) \right]$$

$$+(\dot{\beta}_v \cos\sigma_a \sin\Phi_v) \left[ K(\dot{\Phi}_v - \dot{\beta}_v \sin\sigma_a) - L(-\dot{\sigma}_a \sin\Phi_v + \dot{\beta}_v \cos\sigma_a \cos\Phi_v) \right]$$

$$-L(\ddot{\Phi}_v - \ddot{\beta}_v \sin\sigma_a - \dot{\beta}_v \dot{\sigma}_a \cos\sigma_a)$$

$$+N(-\ddot{\sigma}_a \sin\Phi_v + \ddot{\beta}_v \cos\sigma_a \cos\Phi_v - \dot{\sigma}_a \dot{\beta}_v \cos\Phi_v)$$

$$+N(-\dot{\beta}_v \dot{\sigma}_a \sin\sigma_a \cos\Phi_v - \dot{\beta}_v \dot{\Phi}_v \cos\sigma_a \sin\Phi_v)$$

$$+\dot{\alpha}(N-K)(\dot{\Phi}_v - \dot{\beta}_v \sin\sigma_a) - 2L\dot{\alpha}(-\dot{\sigma}_a \sin\Phi_v + \dot{\beta}_v \cos\sigma_a \cos\Phi_v) = 0 \qquad (6)$$

UNITED STATES PATENT AND TRADEMARK OFFICE
CERTIFICATE OF CORRECTION

PATENT NO.    :   5,335,177
DATED         :   August 2, 1994
INVENTOR(S)   :   BOITEAU, Catherine
                  PARIUS, Roger It is certified that error appears in the above-identified patent and that said Letters Patent is hereby corrected as shown below:

Column 23, line 35, change "Given" to --given--; and replace lines 57-65 (equations 15 and 16) with the following:

-- then the following computation is done :

$\dot{\sigma}_a$ and $\dot{\beta}_v$ in a circuit 82 by the formulae :

$$\frac{\sigma_a(t+dt) - \sigma_a(t)}{dt} = \dot{\sigma}_a(t) \qquad (15)$$

$$\frac{\beta_v(t+dt) - \beta_v(t)}{dt} = \dot{\beta}_v(t) \qquad (16)$$ --

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

Delete column 24 line 6 to column 27, line 68, and insert the following:

— Figure 8 shows a functional diagram of a device that enables the checking of the equations (2), (4) and (6) at the instant t. To this effect, the values $V_p$, $\dot{\phi}_v$, $\sigma_a$, $\beta_v$, $\alpha$ at the instants t (rectangle 85), (t+dt) (rectangle 86) and (t+2dt) (rectangle 87), are used and then the following computation is done in a circuit 88: the first derivatives $\dot{V}_p$, $\dot{\phi}_v$, $\dot{\sigma}_a$, $\dot{\beta}_v$, $\dot{\alpha}$ and second derivatives $\ddot{\phi}_v$, $\ddot{\sigma}_a$, $\ddot{\beta}_v$ by the above formulae (15) and (16) for $\dot{\sigma}_a$ and $\dot{\beta}_v$ and by the following formulae (17) to (22) for the other derivatives.

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

-continued

$$\frac{V_p(t+dt) - V_p(t)}{dt} = \dot{V}_p(t) \qquad (17)$$

$$\frac{\Phi_v(t+dt) - \Phi_v(t)}{dt} = \dot{\Phi}_v(t) \qquad (18)$$

$$\frac{\alpha(t+dt) - \alpha(t)}{dt} = \dot{\alpha}(t) \qquad (19)$$

$$\frac{\Phi_v(t+2dt) - \Phi_v(t+dt) + \Phi_v(t)}{(dt)^2} = \ddot{\Phi}_v(t) \qquad (20)$$

$$\frac{\sigma_a(t+2dt) - 2\sigma_a(t+dt) + \sigma_a(t)}{(dt)^2} = \ddot{\sigma}_a(t) \qquad (21)$$

$$\frac{\beta_v(t+2dt) - 2\beta_v(t+dt) + \beta_v(t)}{(dt)^2} = \ddot{\beta}_v(t) \qquad (22)$$

These values of the parameters and of their first and second derivatives are used in a circuit 89 to compute the equations (2), (4) and (6). If the result of

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

-continued the computations is, for each equation, a value that is different from zero beyond a certain threshold, the circuit 89 gives an alarm signal on the conductor 39. The circuits 88 and 89 form part of the computer 21 (figure 1).

The equations of consistency (2), (4) and (6), which do not bring the forces applied to the aircraft into play, can be used to ascertain in real time (the instant t) that $V_p$, $\beta_v$, $\sigma_a$, $\Phi_v$ and $\alpha$ as well as the first and second derivatives of $\beta_v$, $\sigma_a$ and $\Phi_v$ are consistent, but they cannot be used to check their development in time, i.e. to ascertain that their values at the instants t, (t + dt), (t+2dt) and (t+3dt) vary consistently.

For this checking of the changing situation in time of the aircraft, the invention proposes to use the six equations (1), (2), (3), (4), (5) and (6), defined here above, to compute the parameters :
$\dot{V}_p$, $\dot{\Phi}_v$, $\dot{\sigma}_a$, $\dot{\beta}_v$, $\dot{\alpha}$, $\ddot{\Phi}_v$, $\ddot{\sigma}_a$ and $\ddot{\beta}_v$ at the instant (t+dt) as a function of the values of the forces F, R and Z and of the parameters $V_p$, $\Phi_v$, $\sigma_a$, $\beta_v$ and $\alpha$ at the instant (t+dt).

UNITED STATES PATENT AND TRADEMARK OFFICE
CERTIFICATE OF CORRECTION

PATENT NO. : 5,335,177  
DATED : August 2, 1994  
INVENTOR(S) : BOITEAU, Catherine  
PARIUS, Roger It is certified that error appears in the above-identified patent and that said Letters Patent is hereby corrected as shown below:

-continued

These parameters are given by the following formulae:

$$\dot{V}_p = \frac{F - R}{m} - g\sin\sigma_a \tag{7}$$

$$\dot{\Phi}_v = A'_o + B'_o \dot{\beta}_v + C'_o \ddot{\sigma}_a \tag{8}$$

in which:

$$A'_o = \frac{-\dot{V}_p \dot{\sigma}_a \sin\Phi_v + \dot{V}_p \dot{\beta}_v \cos\sigma_a \cos\Phi_v - V_p \dot{\beta}_v \dot{\sigma}_a \cos\Phi_v \sin\sigma_a}{V_p \dot{\sigma}_a \cos\Phi_v + V_p \dot{\beta}_v \cos\sigma_a \sin\Phi_v + g \cos\sigma_a \sin\Phi_v}$$

$$+ \frac{\dot{\sigma}_a\, g\, \sin\sigma_a\, \sin\Phi_v}{V_p \dot{\sigma}_a \cos\Phi_v + V_p \dot{\beta}_v \cos\sigma_a \sin\Phi_v + g \cos\sigma_a \sin\Phi_v}$$

$$B'_o = \frac{V_p \cos\sigma_a \cos\Phi_v}{V_p \dot{\sigma}_a \cos\Phi_v + V_p \dot{\beta}_v \cos\sigma_a \sin\Phi_v + g \cos\sigma_a \sin\Phi_v}$$

$$C'_o = \frac{-V_p \sin\Phi_v}{V_p \dot{\sigma}_a \cos\Phi_v + V_p \dot{\beta}_v \cos\sigma_a \sin\Phi_v + g \cos\sigma_a \sin\Phi_v}$$

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

-continued $$\dot{\sigma}_a = \frac{Z}{mv_p} \cos\Phi_v - \frac{g}{v_p} \cos\sigma_a \tag{9}$$

$$\dot{\beta}_v = \frac{Z \sin\Phi_v}{mv_p \cos\sigma_a} \tag{10}$$

$$\dot{\alpha} = a_\alpha \dot{\beta}_v + b_\alpha \dot{\sigma}_a + c_\alpha \tag{11}$$

in which :

$$a_\alpha = \frac{k_\alpha A}{j\, nv_p^2}$$

$$b_\alpha = \frac{k_\alpha B}{j\, nv_p^2}$$

$$c_\alpha = \frac{k_\alpha}{j} \left[ \frac{C}{nv_p^2} - \frac{2n\dot{v}_p}{v_p^3} \right]$$

UNITED STATES PATENT AND TRADEMARK OFFICE
CERTIFICATE OF CORRECTION

PATENT NO. : 5,335,177
DATED : August 2, 1994
INVENTOR(S) : BOITEAU, Catherine
PARIUS, Roger It is certified that error appears in the above-identified patent and that said Letters Patent is hereby corrected as shown below:

-continued and $A = \dot{\beta}_v\, g^2\, V_p^2\, \cos^2 \sigma_a$ $B = g^2\, V_p^2\, \dot{\sigma}_a + g^3\, V_p\, \cos\sigma_a$ $C = g^2 \left[ -V_p^2\, \dot{\beta}_v^2\, \dot{\sigma}_a \cos\sigma_a + V_p\, \dot{V}_p\, (\dot{\beta}_v^2 \cos^2\sigma_a + \dot{\sigma}_a^2) \right]$ $\quad + g^2 \left[ -V_p\, g\, \dot{\sigma}^2 \sin\sigma_a + g\dot{\sigma}_a \dot{V}_p \cos\sigma_a - g^2\, \sigma_a \cos\sigma_a \sin\sigma_a \right]$ with the incidence $\alpha$ which is a function of the load factor n perpendicular to the speed vector and of the aerodynamic speed $V_p$ by the relationship :

$\alpha = C_{pn} + k_\alpha\, n\, /j\, V_p^2$ .

where $k_\alpha$ and $C_{pn}$ are aerodynamic coefficients of the aircraft and j is the density of air.
The load factor n given by the equation :

$n = 1/g \left[ (V_p \dot{\beta}_v \cos\sigma_a)^2 + (V_p \dot{\sigma}_a + g\cos\sigma_a)^2 \right]^{1/2}$

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

-continued

By successive substitutions and derivations, the following relationships are established on the basis of the equations (1) to (6):

$$A_8 + B_8\, \ddot{\beta}_v + C_8\, \ddot{\sigma}_a + D_8\, \dot{\beta}_v\, \dot{\sigma}_a + E_8\, \dot{\beta}_v^{\,2} + F_8\, \dot{\sigma}_a^{\,2} = 0 \quad (13)$$

$$A_9 + B_9\, \ddot{\beta}_v + C_9\, \ddot{\sigma}_a + D_9\, \dot{\beta}_v\, \dot{\sigma}_a + E_9\, \dot{\beta}_v^{\,2} + F_9\, \dot{\sigma}_a^{\,2} = 0 \quad (14)$$

This system is formed by two polynomials in $\ddot{\sigma}_a$ and $\ddot{\beta}_v$ the coefficients $A_8$ to $F_8$ and $A_9$ to $F_9$ of which are explicit coefficients of $V_p$, $\Phi_v$, $\sigma_a$, $\beta_v$ and $\dot{\sigma}_a$ and $\dot{\beta}_v$ being themselves a function of $V_p$, $\Phi_v$, $\sigma_a$, $\beta_v$ and $\alpha$. These coefficients are given by the following relationships:

$$A_8 = F_0 + A_0 A'_0$$
$$B_8 = A_0 B'_0 + A'_0 B_0 + D_0$$
$$C_8 = A_0 C'_0 + A'_0 C_0 + E_0$$
$$D_8 = B_0 C'_0 + B'_0 C_0$$
$$E_8 = B_0 B'_0$$
$$F_8 = C_0 C'_0$$
$$A_9 = A_5 A'^{\,2}_0 + B_5 A'_0 + E_5$$
$$B_9 = C_5 + B_5 B'_0 + 2\, A_5 A'_0 B'_0$$
$$C_9 = D_5 + B_5 C'_0 + 2\, A_5 A'_0 C'_0$$
$$D_9 = 2\, A_5\, B'_0 C'_0$$

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

-continued

$$E_9 = 2 A_5 {B'_0}^2$$
$$F_9 = 2 A_5 {C'_0}^2$$

the coefficients $A'_0$, $B'_0$ and $C'_0$ having been defined earlier in relation to the formula (8).

$$A_O = LA_4 - KA_6$$
$$B_O = LB_4 - KB_6$$
$$C_O = LC_4 - KC_6$$
$$D_O = LD_4 - KD_6$$
$$E_O = LE_4 - KE_6$$
$$F_O = LF_4 - KF_6$$
$$A_4 = 2Lc_\alpha - L\dot\sigma_a \cos\Phi_V$$
$$B_4 = 2La_\alpha$$
$$C_4 = 2Lb_\alpha$$
$$D_4 = -K\sin\sigma_a + L\cos\sigma_a\cos\Phi_V$$
$$\quad + a_\alpha\left[-2L\dot\beta_V\sin\sigma_a+(N-K)(-\dot\sigma_a\sin\Phi_V+\dot\beta_V\sigma_a\cos\Phi_V)\right]$$

$$E_4 = -L\sin\Phi_V+b_\alpha\left[-2L\dot\beta_V\sin\sigma_a+(N-K)(-\dot\sigma_a\sin\Phi_V+\dot\beta_V\cos\sigma_a\cos\Phi_V)\right]$$

$$F_4 = (\dot\sigma_a\cos\Phi_V)+\left[L\dot\beta_V\sin\sigma_a+N(-\dot\sigma_a\sin\Phi_V+\dot\beta_V\cos\sigma_a\cos\Phi_V)\right]$$

$$\quad +(\dot\beta_V\cos\sigma_a\sin\Phi_V)\left[L\dot\beta_V\sin\sigma_a+N(-\dot\sigma_a\sin\Phi_V+\dot\beta_V\cos\sigma_a\cos\Phi_V)\right]$$

$$\quad -(-\dot\sigma_a\sin\Phi_V+\dot\beta_V\cos\sigma_a\cos\Phi_V)B(\dot\sigma_a\cos\Phi_V+\dot\beta_V\cos\sigma_a\sin\Phi_V)$$

$$\quad -K\dot\beta_V\dot\sigma_a\cos\sigma_a-L(\dot\sigma_a\dot\Phi_V\cos\Phi_V+\dot\beta_V\dot\sigma_a\sin\sigma_a\cos\Phi_V)$$

$$\quad +c_\alpha\left[-2L\dot\beta_V\sin\sigma_a+(N-K)(-\dot\sigma_a\sin\Phi_V+\dot\beta_V\cos\sigma_a\cos\Phi_V)\right]$$

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

-continued

$$A_5 = -L$$

$$B_5 = K(-\dot{\sigma}_a \sin\Phi_V + \dot{\beta}_V \cos\sigma_a \cos\Phi_V)$$
$$\quad + N(-\dot{\sigma}_a \sin\Phi_V + \dot{\beta}_V \cos\sigma_a \cos\Phi_V)$$
$$\quad - 2L\dot{\beta}_V \sin\sigma_a - B(\dot{\sigma}_a \sin\Phi_V - \dot{\beta}_V \cos\sigma_a \cos\Phi_V)$$

$$C_5 = B\cos\sigma_a \sin\Phi_V$$

$$D_5 = B\cos\Phi_V$$

$$E_5 = (-\dot{\sigma}_a \sin\Phi_V)\left[-K\dot{\beta}_V\sin\sigma_a - L(-\dot{\sigma}_a\sin\Phi_V + \dot{\beta}_V\cos\sigma_a\cos\Phi_V)\right]$$
$$\quad + (\dot{\beta}_V\cos\sigma_a\cos\Phi_V)\left[K\dot{\beta}_V\sin\sigma_a - L(-\dot{\sigma}_a\sin\Phi_V + \dot{\beta}_V\cos\sigma_a\cos\Phi_V)\right]$$
$$\quad -\dot{\beta}_V\sin\sigma_a\left[L\dot{\beta}_V\sin\sigma_a + N(-\dot{\sigma}_a\sin\Phi_V + \dot{\beta}_V\cos\sigma_a\cos\Phi_V\right]$$
$$\quad -B(\dot{\beta}_V\dot{\sigma}_a\sin\sigma_a\sin\Phi_V) - f(R\sin\alpha + Z\cos\alpha)$$

$$A_6 = (B-N-K)(\dot{\sigma}_a\cos\Phi_V + \dot{\beta}_V\cos\sigma_a\sin\Phi_V) + (N-K)c_\alpha$$

$$B_6 = (N-K)a_\alpha$$

$$C_6 = (N-K)b_\alpha$$

$$D_6 = L\sin\sigma_a + N\cos\sigma_a\cos\Phi_V$$
$$\quad + a_\alpha\left[-(N-K)(\dot{\beta}_V\sin\sigma_a - 2L(-\dot{\sigma}_a\sin\Phi_V + \dot{\beta}_V\cos\sigma_a\cos\Phi_V)\right]$$

UNITED STATES PATENT AND TRADEMARK OFFICE
CERTIFICATE OF CORRECTION

PATENT NO.   : 5,335,177
DATED        : August 2, 1994
INVENTOR(S)  : BOITEAU, Catherine
               PARIUS, Roger It is certified that error appears in the above-identified patent and that said Letters Patent is hereby corrected as shown below:

-continued $$E_6 = -N\sin\Phi_v + b_\alpha \left[ -(N-K)\dot{\beta}_v\sin\sigma_a - 2L(-\dot{\sigma}_a\sin\Phi_v + \dot{\beta}_v\cos\sigma_a\cos\Phi_v) \right]$$

$$\begin{aligned}F_6 = &-B\dot{\beta}_v\sin\sigma_a(\dot{\sigma}_a\cos\Phi_v + \dot{\beta}_v\cos\sigma_a\sin\Phi_v) \\ &+(\dot{\sigma}_a\cos\Phi_v)\left[K\dot{\beta}_v\sin\sigma_a + L(-\dot{\sigma}_a\sin\Phi_v + \dot{\beta}_v\cos\sigma_a\cos\Phi_v)\right] \\ &+\dot{\beta}_v\cos\sigma_a\sin\Phi_v)\left[K\dot{\beta}_v\sin\sigma_a + L(-\dot{\sigma}_a\sin\Phi_v + \dot{\beta}_v\cos\sigma_a\cos\Phi_v)\right] \\ &+L\dot{\beta}_v\dot{\sigma}_a\cos\sigma_a - N(\dot{\sigma}_a\dot{\beta}_v\sin\sigma_a\cos\Phi_v) \\ &+c_\alpha\left[-(N-K)\dot{\beta}_v\sin\sigma_a - 2L(-\dot{\sigma}_a\sin\Phi_v + \dot{\beta}_v\cos\sigma_a\cos\Phi_v)\right]\end{aligned}$$

The system of equations (13) and (14) may be resolved by various digital methods, in particular by Newton's method.

After several computation loops, we obtain $\ddot{\beta}_v$ and $\ddot{\sigma}_a$ to the desired precision: this enables the computation of $\dot{\Phi}_v$ by equation (8), of $\alpha$ by equation (11), of $\ddot{\Phi}_v$ by equation (12).

$$\ddot{\Phi}_v = -\frac{1}{K}\left[(D_4\ \ddot{\beta}_v + E_4\ \ddot{\sigma}_a + F_4 + \dot{\Phi}_v(A_4 + B_4\ \dot{\beta}_v + C_4\ \dot{\sigma}_a)\right] \quad (12)$$

where $A_4$, $B_4$, $C_4$, $D_4$, $E_4$ and $F_4$ are explicit coefficients (defined here above) of $V_p$, $\Phi_v$, $\sigma_a$, $\beta_v$ and

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

-continued their first derivatives, this equation being derived from the equation (4) after elimination of $\alpha$.

The values of the parameters:

$\dot{V}_p$, $\dot{\Phi}_v$, $\dot{\sigma}_a$, $\dot{\beta}_v$, $\dot{\alpha}$, $\ddot{\Phi}_v$, $\ddot{\sigma}_a$, $\ddot{\beta}_v$ which have been computed by means of the formulae and equations described here above in using the values of the parameters obtained by the sensors at the instant (t+dt) and of the forces computed at the instant t by the equations (1), (3) and (5) are compared with the values of the corresponding parameters which are determined from the navigation parameters at the instants t, (t+dt) and (t+2dt) in implementing the relationships (15) to (22).

By analogy, the first and second derivatives at the instant (t+dt) are computed by means of the values at the instants (t+dt), (t+2dt) and (t+3dt).

Figure 9 gives a very schematic summary view of this aspect of the invention which relates to dynamic checks of consistency of the changing situation of the aircraft. At the instant t, the sensors give the parameters $V_p$, $\Phi_v$, $g_a$, $\beta_v$ and $\alpha$ (rectangle 100) which are combined according to the equations (1), (3) and (5)

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

-continued (rectangle 103) with the values of the first and second derivatives $\dot{V}_p$, $\dot{\Phi}_v$, $\dot{\sigma}_a$, $\dot{\beta}_v$, $\dot{\alpha}$, $\ddot{\Phi}_v$, $\ddot{\sigma}_a$, $\ddot{\beta}_v$ (rectangle 102) computed at the instant t by means of the equations (15) to (22) (rectangle 112) of the changes undergone by the aircraft to compute the forces F, R and Z that are applied to the aircraft at the instant t.

If it is assumed that the computed forces F, R and Z at the instant t vary little during the time interval dt, they can be used in a computer 104 to obtain the first derivatives $\dot{V}_p$, $\dot{\Phi}_v$, $\dot{\sigma}_a$, $\dot{\beta}_v$, $\dot{\alpha}$ and second derivatives $\ddot{\Phi}_v$, $\ddot{\sigma}_a$, $\ddot{\beta}_v$ (rectangle 105) at the instant (t+dt) in using the above-defined equations (7) to (14). To this effect, the computer 104 must also be given the value of the parameters $V_p, \Phi_v, \sigma_a, \beta_v$ and $\alpha$ at the instant (t+dt) as well as the initial values of $\ddot{\sigma}_a$ and $\ddot{\beta}_v$ at the instant t (rectangle 102) to make a computation, by successive approximations, of the values of $\dot{\sigma}_a$ and $\dot{\beta}_v$, at the instant (t+dt). --

UNITED STATES PATENT AND TRADEMARK OFFICE
CERTIFICATE OF CORRECTION

PATENT NO.  : 5,335,177

DATED       : August 2, 1994

INVENTOR(S) : BOITEAU, Catherine
              PARIUS, Roger

It is certified that error appears in the above-identified patent and that said Letters Patent is hereby corrected as shown below:

Delete column 29, line 5 to column 30, line 23, and insert the following:

—— 2. A method as in claim 1 for ensuring the reliability of the data used to pilot an aircraft, said data corresponding, firstly, to parameters given by sensors and, secondly, to parameters indicative of navigation that are given by a computing device and onboard instruments, wherein said comparing step includes the steps of:

(a) computing, from navigation parameters $\sigma_a$ indicative of horizon, and $\beta_v$, which is an angle between two axes, at the instants t and (t+dt), the first derivatives $\dot{\sigma}_a$, $\dot{\beta}_v$, being at the instant t, and (b) checking the relationship (2) by using the values of the parameters $V_p$ indicating aerodynamic speed, $\Phi_v$, $\sigma_a$ and $\beta_v$ indicating position angle values at an instant t and of the first derivatives of $\dot{\sigma}_a$ and $\dot{\beta}_v$, at the instant t computed by the operation (a), and wherein said generating an alarm step comprises the step of generating an alarm signal when said relationship (2) is not verified to a given precision.

UNITED STATES PATENT AND TRADEMARK OFFICE
CERTIFICATE OF CORRECTION

PATENT NO.   :   5,335,177
DATED        :   August 2, 1994
INVENTOR(S)  :   BOITEAU, Catherine
                 PARIUS, Roger It is certified that error appears in the above-identified patent and that said Letters Patent is hereby corrected as shown below:

3. A method as in claim 2 for ensuring the reliability of the data used to pilot an aircraft, said information elements corresponding, firstly, to parameters given by sensors and, secondly, to parameters indicative of navigation parameters that are given by a computing device and onboard instruments, wherein said method includes the further steps of:

(d) computing from the navigation parameters of $\sigma_a$, $\beta_v$, $\phi_v$ and $\alpha$ at instants t, (t+dt) and (t+2dt), the first derivatives $\dot{\sigma}_a$, $\dot{\beta}_v$, $\dot{\phi}_v$ and $\dot{\alpha}$ and of the second derivatives $\ddot{\sigma}_a$, $\ddot{\beta}_v$, and $\ddot{\phi}_v$ at the instant t, (e) checking of the relationships (4) and (6) in using the values of $V_p$, $\sigma_a$, $\beta_v$, $\phi_v$, $\alpha$ and the first derivatives of $\dot{\sigma}_a$, $\dot{\beta}_v$, $\dot{\phi}_v$ and $\dot{\alpha}$ and second derivatives $\ddot{\sigma}_a$, and $\ddot{\beta}_v$, and $\ddot{\phi}_v$ at the instant (t) computed by the operation (d), and (f) generating an alarm signal when one of said relationships (4) and (6) is not verified to a given precision.

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

4. A method as in claim 3 wherein said method includes the further steps of:

(g) computing, by means of the relationships (1), (3) and (5) the forces F, R and Z applied to the aircraft at the instant t by using the values of the parameters $V_p$, $\Phi_v$, $\sigma_a$, $\beta_v$, $\alpha$ at the instant t, the values of the first derivatives $\dot{V}_p$, $\dot{\Phi}_v$, $\dot{\sigma}_a$, $\dot{\beta}_v$, and $\dot{\alpha}$ at the instant t computed from $V_p$, $\Phi_v$, $\sigma_a$, $\beta_v$ and $\alpha$ at the instants t and (t+dt) and the values of the secondary derivatives $\ddot{\sigma}_\alpha$ and $\ddot{\beta}_v$ at the instant t computed from $\sigma_\alpha$ and $\beta_v$ at the instants t (t+dt) and (t+2dt)

(h) computing from the navigation parameters $V_p$, $\Phi_v$, $\sigma_\alpha$, $\beta_v$, and $\alpha$ at the instant (t+dt) and from the values of the applied forces obtained by the operation (g), of the parameters $\dot{V}_p$, $\dot{\Phi}_v$, $\dot{\sigma}_\alpha$, $\dot{\beta}_v$, and $\dot{\alpha}$, $\ddot{\Phi}_v$, $\ddot{\sigma}_\alpha$, $\ddot{\beta}_v$, at the instant (t+dt)

(i) the computation of the parameters $\dot{V}_p$, $\dot{\Phi}_v$, $\dot{\sigma}_\alpha$, $\dot{\beta}_v$, and $\dot{\alpha}$, $\ddot{\Phi}_v$, $\ddot{\sigma}_\alpha$, $\ddot{\beta}_v$, at the instant (t+dt) in using the values of the parameters $V_p$, $\Phi_v$, $\sigma_\alpha$, $\beta_v$, and $\alpha$ at the instants (t+dt), (t+2dt) and (t+3dt)

UNITED STATES PATENT AND TRADEMARK OFFICE
CERTIFICATE OF CORRECTION

PATENT NO. : 5,335,177

DATED : August 2, 1994

INVENTOR(S) : BOITEAU, Catherine
PARIUS, Roger

It is certified that error appears in the above-identified patent and that said Letters Patent is hereby corrected as shown below:

(j) computing the values of the parameters computed by the operation (h) with those computed by the operation (i);

(k) generating an alarm signal when the result of the comparison indicates that one of the values compared is different beyond a certain threshold.

5. A method according to claim 4 wherein, in the step (g) consisting in computing the forces applied to the aircraft F, R and Z at the instant t is done by using the values of the parameters $V_p$, $\Phi_v$, $\sigma_\alpha$, $\beta_v$, and $\alpha$ at the instant t and the values of the first derivatives $\dot{V}_p$, $\dot{\Phi}_v$, $\dot{\sigma}_\alpha$, $\dot{\beta}_v$, and $\dot{\alpha}$ and of the second derivatives $\ddot{\sigma}_\alpha$, $\ddot{\beta}_v$, which have been computed at the instant t.

UNITED STATES PATENT AND TRADEMARK OFFICE
CERTIFICATE OF CORRECTION

PATENT NO. : 5,335,177
DATED : August 2, 1994
INVENTOR(S) : BOITEAU, Catherine
PARIUS, Roger It is certified that error appears in the above-identified patent and that said Letters Patent is hereby corrected as shown below:

6. A method according to claim 5, further comprising the following additional step of:
(1) selecting the value of the parameter to be chosen for computing the forces F, R and Z, either the value coming from the computation by the relationships (15) to (22) or that coming from the computation, depending on the value of the alarm signal given by the operation (k).

7. A method according to claim 4 wherein in the step (h), consisting in computing the values of $\sigma_\alpha$ and $\beta_v$, at the instant (t+dt), is done by resolving equations by successive approximation, the initial values of which are those of $\sigma_\alpha$ and $\beta_v$, at the instant t. —

Signed and Sealed this

Sixteenth Day of July, 1996

Attest:

BRUCE LEHMAN

*Attesting Officer*   *Commissioner of Patents and Trademarks*